United States Patent
Miyazaki

(10) Patent No.: US 9,631,072 B2
(45) Date of Patent: Apr. 25, 2017

(54) RUBBER COMPOSITION AND TIRE

(71) Applicant: SUMITOMO RUBBER INDUSTRIES, LTD., Kobe-shi, Hyogo (JP)

(72) Inventor: Sumiko Miyazaki, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 0 days.

(21) Appl. No.: 15/055,025

(22) Filed: Feb. 26, 2016

(65) Prior Publication Data

US 2016/0272792 A1    Sep. 22, 2016

(30) Foreign Application Priority Data

Mar. 19, 2015   (JP) ................ 2015-056788

(51) Int. Cl.

| C08L 1/00 | (2006.01) |
|---|---|
| C08L 7/00 | (2006.01) |
| C08L 1/02 | (2006.01) |
| C08L 1/10 | (2006.01) |
| C08L 9/00 | (2006.01) |
| C08L 9/06 | (2006.01) |
| C08L 19/00 | (2006.01) |
| C08L 23/22 | (2006.01) |

(52) U.S. Cl.
CPC ........ *C08L 7/00* (2013.01); *C08L 1/02* (2013.01); *C08L 1/10* (2013.01); *C08L 9/00* (2013.01); *C08L 9/06* (2013.01); *C08L 19/00* (2013.01); *C08L 23/22* (2013.01); *C08L 2205/03* (2013.01); *C08L 2666/26* (2013.01)

(58) Field of Classification Search
CPC .... C08L 7/00; C08L 9/06; C08L 19/00; C08L 9/00; C08L 2205/03
USPC .......................................................... 524/35
See application file for complete search history.

(56) References Cited

U.S. PATENT DOCUMENTS

2010/0076118 A1* 3/2010 Yano .................. B60C 1/00
                                                                523/351

FOREIGN PATENT DOCUMENTS

| JP | 2005-75856 A | 3/2005 | |
|---|---|---|---|
| JP | 2005-133025 A | 5/2005 | |
| JP | WO 2013081138 A1 * | 6/2013 | ............... C08B 3/20 |
| JP | 2013-204010 A | 10/2013 | |

OTHER PUBLICATIONS

Translation of WO 2013/081138, Jun. 6, 2013.*

* cited by examiner

*Primary Examiner* — Hui Chin
(74) *Attorney, Agent, or Firm* — Birch, Stewart, Kolasch & Birch, LLP

(57) ABSTRACT

Provided are a rubber composition that is environmentally friendly and achieves both excellent breaking properties and low energy loss, and a tire that includes a component prepared using the same and is environmentally friendly and excellent in rolling resistance properties and durability. The present invention provides a rubber composition containing a rubber component, a specific chemically modified microfibrillated cellulose, and carbon black.

5 Claims, No Drawings

RUBBER COMPOSITION AND TIRE

TECHNICAL FIELD

The present invention relates to a rubber composition and a tire including a component prepared using the same.

BACKGROUND ART

Heretofore known techniques for improving handling stability involves reinforcing a rubber with a short fiber such as aramid or cellulose or a crystalline polymer such as syndiotactic polybutadiene to improve its hardness and modulus, for example, its complex elastic modulus (E*) at 70° C. (see e.g., Patent Literature 1). However, even if the elastic modulus is improved, all of the properties other than handling stability, required for tires are not necessarily improved.

Patent Literature 1 proposes a rubber composition formed of a diene rubber component, starch, and cellulose with the aim of providing a rubber composition excellent in abrasion resistance, and also proposes the use of in particular bacterial cellulose as the cellulose. The techniques of Patent Literature 1, however, have the problems of poor breaking properties and large energy loss at the interface between the rubber and the cellulose due to the poor compatibility between the rubber and the cellulose.

Patent Literature 2 discloses a rubber composition that can achieve both low resilience and rigidity (handling stability) and specifically discloses a rubber composition containing a diene rubber together with a fine powder of cellulose fibers prepared from natural plant fibers. The techniques of Patent Literature 2 still have room for improvement in obtaining rigidity and reinforcing properties proportionally to the amount of cellulose fibers added because the cellulose fibers thus prepared have a short fiber length.

When a water dispersion of cellulose is dried, the cellulose aggregates and disadvantageously such cellulose, unless modified, fails to be dispersed at the nano level during mixing with rubber. As a result, it is difficult to improve breaking strength and to reduce rolling resistance. Meanwhile, the conventional treatment for dispersing cellulose includes temporarily dispersing cellulose in water and introducing rubber latex into the dispersion, followed by stirring and drying. This approach is effective for dispersing cellulose, but limits the type of rubber used to latex (see e.g., Patent Literature 3).

Accordingly, it is still difficult to obtain a rubber composition that is environmentally friendly and has excellent breaking properties and low energy loss.

CITATION LIST

Patent Literature

Patent Literature 1: JP 2005-133025 A
Patent Literature 2: JP 2005-75856 A
Patent Literature 3: JP 2013-204010 A

SUMMARY OF INVENTION

Technical Problem

The present invention aims to solve the problems mentioned above and provide a rubber composition that is environmentally friendly and achieves both excellent breaking properties and low energy loss, and a tire that includes a component prepared using the same and is environmentally friendly and excellent in rolling resistance properties and durability.

Solution to Problem

The present invention relates to a rubber composition, containing a rubber component, a chemically modified microfibrillated cellulose, and carbon black, the chemically modified microfibrillated cellulose having a structure in which part of the hydroxyl hydrogen atoms of microfibrillated cellulose is replaced with a substituent represented by the following formula (1):

$$-A-R^1 \qquad (1)$$

wherein $R^1$ represents a C3-C30 hydrocarbon group having at least one unsaturated bond, and A represents a carbonyl group (—CO—).

Preferably, the chemically modified microfibrillated cellulose has a degree of substitution of 0.05 to 2.0.

Preferably, an amount of the carbon black is 5 to 200 parts by mass per 100 parts by mass of the rubber component.

Preferably, an amount of the chemically modified microfibrillated cellulose is 0.5 to 10 parts by mass per 100 parts by mass of the rubber component.

Preferably, the chemically modified microfibrillated cellulose has an average fiber diameter of 2 to 100 nm.

The present invention also relates to a tire, including a component prepared using the rubber composition.

Advantageous Effects of Invention

The present invention can provide a rubber composition that is environmentally friendly and achieves both excellent breaking properties and low energy loss, and a tire that includes a component prepared using the rubber composition and is environmentally friendly and excellent in rolling resistance properties and durability.

DESCRIPTION OF EMBODIMENTS

The rubber composition of the present invention contains a rubber component, a chemically modified microfibrillated cellulose, and carbon black, wherein the chemically modified microfibrillated cellulose has a structure in which part of the hydroxyl hydrogen atoms of microfibrillated cellulose is replaced with a substituent represented by the following formula (1):

$$-A-R^1 \qquad (1)$$

wherein $R^1$ represents a C3-C30 hydrocarbon group having at least one unsaturated bond, and A represents a carbonyl group (—CO—). The chemically modified microfibrillated cellulose acts as a rubber-reinforcing agent. Since the chemically modified microfibrillated cellulose has a specific substituent (modifying group) represented by the formula (1) introduced therein, this modifying group can be bonded directly to the rubber during vulcanization to strengthen the interface between the rubber and the chemically modified microfibrillated cellulose and also to improve the compatibility between the chemically modified microfibrillated cellulose and the rubber. As a result of various studies, the present inventor has found for the first time that the combined use of such a chemically modified microfibrillated cellulose containing an unsaturated bond with carbon black can synergistically improve the dispersibility of the chemically modified microfibrillated cellulose in the rubber composition and, for example, can markedly improve the dispersibility of the chemically modified microfibrillated cellulose as compared with the combined use of a chemically modified microfibrillated cellulose having no unsaturated bond (e.g., a chemically modified microfibrillated cellulose only having a saturated bond) and carbon black.

Accordingly, in the rubber composition of the present invention, the specific chemically modified microfibrillated cellulose is highly uniformly dispersed in the rubber composition, so that the interface with the rubber can be further strengthened and energy loss at the interface with the rubber can be markedly reduced. Therefore, a rubber composition excellent in breaking properties and fuel economy can be obtained. Thus, for example, if the rubber composition of the present invention is used in tires, it can enable the tires to achieve high levels of breaking strength (durability) and rolling resistance properties (fuel economy) simultaneously.

Further, since microfibrillated cellulose is a material that is not made from petroleum, the rubber composition allows for reduction of the amount of petroleum resources used and can thus be environmentally friendly.

<Rubber Component>

As the rubber component used in the present invention, rubbers commonly used in the rubber industry can be used. Preferred are, for example, diene rubbers such as natural rubber (NR), epoxidized natural rubber (ENR), hydrogenated natural rubber, polyisoprene rubber (IR), polybutadiene rubber (BR), styrene-butadiene rubber (SBR), styrene-isoprene-butadiene rubber (SIBR), acrylonitrile-butadiene rubber (NBR), and chloroprene rubber (CR). The rubber component may also include rubber materials other than the diene rubbers. Examples of other rubber materials include butyl-based rubbers such as halogenated butyl rubber (X-IIR) and butyl rubber (IIR).

These rubber materials may be used alone or in combinations of two or more thereof.

The optimal type or combination needs to be selected for the rubber component according to the physical properties required for the particular component to be prepared using the rubber composition of the present invention. The rubber component preferably contains NR as an essential constituent, regardless of the type of component prepared using the rubber composition of the present invention. The use of NR as the rubber component can further enhance the dispersibility of the chemically modified microfibrillated cellulose in the rubber composition, which is markedly improved by the combined use of the chemically modified microfibrillated cellulose and carbon black according to the present invention. Thus, the effects of the present invention can be more significantly achieved.

The natural rubber is not particularly limited and, for example, those generally known in the rubber industry, such as SIR20, RSS#3, or TSR20 can be used.

The amount of each rubber contained in the rubber component is not particularly limited and can be appropriately chosen. The amount of the NR based on 100% by mass of the rubber component is preferably 5% by mass or more, more preferably 10% by mass or more, further preferably 20% by mass or more. The NR in an amount of less than 5% by mass might not produce its effect as described above. Moreover, the upper limit of the amount of the NR is not particularly limited and may be 100% by mass.

<Chemically Modified Microfibrillated Cellulose>

The microfibrillated cellulose used as a starting material for the chemically modified microfibrillated cellulose used in the present invention may for example be derived from at least one selected from natural products such as wood, bamboo, hemp, jute, kenaf, agricultural crop wastes, cloth, regenerated pulp, used paper, bacterial cellulose, and sea squirt cellulose.

In the present invention, the microfibrillated cellulose typically means cellulose fibers having an average fiber diameter in the range of 2 nm to 1 μm and more typically cellulose fibers having a microstructure having an average fiber diameter of 100 nm or smaller, formed by aggregation of cellulose molecules. Typically, for example, the microfibrillated cellulose may be formed of aggregates of cellulose fibers having the average fiber diameter as described above.

In the present invention, the use of such a natural product-derived microfibrillated cellulose can produce the effect of significantly reducing carbon dioxide emissions, whereby the rubber composition of the present invention can be environmentally friendly. Among others, the microfibrillated cellulose is particularly preferably a microfibrillated cellulose derived from at least one selected from the group consisting of wood, bamboo, hemp, jute, kenaf, agricultural crop wastes, cloth, regenerated pulp, and used paper, because then the effect of reducing carbon dioxide emissions is achieved well and it is easily available. These microfibrillated celluloses may be used alone or in combinations of two or more thereof.

The microfibrillated cellulose may be produced by any method, such as, for example, by chemically treating the starting material of the microfibrillated cellulose with a chemical agent such as sodium hydroxide, followed by mechanical grinding or beating with a refiner, a twin screw kneader (twin screw extruder), a twin screw kneading extruder, a high-pressure homogenizer, a media mill, a stone mill, a grinder, a vibration mill, a sand grinder, or the like. Other methods include a method that involves treating the starting material of the microfibrillated cellulose at a high pressure.

The chemically modified microfibrillated cellulose used in the present invention has a structure in which part of the hydroxyl hydrogen atoms of microfibrillated cellulose is replaced with a substituent represented by the following formula (1):

$$-A-R^1 \qquad (1)$$

wherein $R^1$ represents a C3-C30 hydrocarbon group having at least one unsaturated bond, and A represents a carbonyl group (—CO—).

The chemically modified microfibrillated cellulose may be used alone or in combinations of two or more. In exemplary embodiments combining two or more of chemically modified microfibrillated celluloses, combinations of chemically modified microfibrillated celluloses differing in the type of substituent, the type of starting material of the microfibrillated cellulose, the average fiber diameter, or the like may be used.

In the formula (1), $R^1$ represents a C3-C30 hydrocarbon group having at least one unsaturated bond, and the number of carbon atoms is preferably 5 or more, more preferably 10 or more, further preferably 15 or more. The hydrocarbon group having 3 or more carbon atoms can react with, for example, a crosslinking agent such as sulfur by the dehydrogenation of the C—H in α-methyl or α-methylene adjacent to the unsaturated bond. In the case of the hydrocarbon group having 2 or more unsaturated bonds, the lower limit of the number of carbon atoms in the hydrocarbon group is preferably 2p+1 (p represents the number of unsaturated bonds).

Conversely, the number of carbon atoms is preferably 25 or less, more preferably 20 or less. The hydrocarbon group having 30 or less carbon atoms can impart hydrophobicity to the microfibrillated cellulose.

The unsaturated bond in $R^1$ may be a double bond or a triple bond. Among them, a double bond is preferred. Moreover, the number of unsaturated bonds in $R^1$ may be 1 or 2 or more. The upper limit of the number of unsaturated bonds is not particularly limited and is, for example, preferably approximately 6. The number of unsaturated bonds is, for example, preferably 1 to 5, more preferably 1 to 3.

When the unsaturated bond in $R^1$ is a double bond, the resulting group can form a cis or trans structural isomer. Any of the structural isomers can be used without particular limitations.

In the formula (1), A represents a carbonyl group (—CO—). Specific examples of the substituent represented by the formula (1) (—C(=O)—$R^1$) include residues obtained by the removal of —OH from the carboxylic acid group of unsaturated aliphatic carboxylic acids, including: mono-unsaturated aliphatic carboxylic acids such as crotonic acid, myristoleic acid, palmitoleic acid, oleic acid, elaidic acid, vaccenic acid, gadoleic acid, eicosenoic acid, erucic acid, and nervonic acid; di-unsaturated aliphatic carboxylic acids such as sorbic acid, linoleic acid, eicosadienoic acid, and docosadienoic acid; tri-unsaturated aliphatic carboxylic acids such as linolenic acid, pinolenic acid, eleostearic acid, dihomo-γ-linolenic acid, and eicosatrienoic acid; tetra-unsaturated aliphatic carboxylic acids such as stearidonic acid, arachidonic acid, eicosatetraenoic acid, and adrenic acid; penta-unsaturated aliphatic carboxylic acids such as bosseopentaenoic acid, eicosapentaenoic acid, osbond acid, clupanodonic acid, and tetracosapentaenoic acid; and hexa-unsaturated aliphatic carboxylic acids such as docosahexaenoic acid and nisinic acid. Among them, palmitoleic acid, oleic acid, or vaccenic acid is preferred.

The chemically modified microfibrillated cellulose may have one or two or more of these substituents.

The degree of substitution (DS) of the chemically modified microfibrillated cellulose is preferably 0.05 to 2.0 from the standpoint of uniformly dispersing the highly hydrophilic microfibrillated cellulose in a highly hydrophobic matrix such as a rubber component and of improving the water resistance of the microfibrillated cellulose. The degree of substitution is more preferably 0.1 or higher. Also, the degree of substitution is more preferably 0.8 or lower.

The degree of substitution means the average number per glucose ring unit of hydroxy groups substituted by other functional groups through chemical modification, among the hydroxy groups of the cellulose, and the theoretical maximum is 3.

When the chemically modified microfibrillated cellulose is a combination of two or more types, the degree of substitution is calculated as the average of the whole chemically modified microfibrillated celluloses.

The degree of substitution (DS) can be analyzed by various analysis methods such as the rate of increase in weight, elemental analysis, neutralization titration, infrared spectroscopy, $^1$H-NMR, or $^{13}$C-NMR after removal of by-products, etc., from the chemically modified microfibrillated cellulose.

In addition to the replacement with the substituent represented by the formula (1), part of the hydroxyl hydrogen atoms of the cellulose of the chemically modified microfibrillated cellulose may be replaced, if necessary, with, for example, a substituent represented by the following formula (2):

$$-A-R^2 \qquad (2)$$

wherein $R^2$ represents a C1-C30 linear or branched alkyl group, and A represents a carbonyl group (—CO—), in order to further improve the hydrophobicity of the chemically modified microfibrillated cellulose.

Since the chemically modified microfibrillated cellulose used in the present invention has a structure in which part of the hydroxy groups of the cellulose forming microfibrillated cellulose is replaced with a substituent containing the aforementioned hydrocarbon group containing an unsaturated bond, hydrophobicity can be imparted to the highly hydrophilic microfibrillated cellulose. For this reason, the chemically modified microfibrillated cellulose can be dispersed well in a highly hydrophobic matrix such as a rubber component.

Also since the substituent in the chemically modified microfibrillated cellulose contains the aforementioned hydrocarbon group containing an unsaturated bond, the chemically modified microfibrillated cellulose has a structure in which the C—H in α-methyl or α-methylene positioned adjacent to the unsaturated bond can be easily dehydrogenated. Accordingly, when the chemically modified microfibrillated cellulose and a crosslinking agent such as sulfur are added into a matrix material capable of crosslinking, e.g., a rubber component, and they are cross-linked, a cross-linked structure can be formed not only between the matrix material molecules but also between the matrix and the chemically modified microfibrillated cellulose.

Hence, the chemically modified microfibrillated cellulose can be suitably used as a reinforcing agent or the like for matrix materials such as a rubber component to which it is added together with a crosslinking agent such as sulfur.

The average fiber diameter of the chemically modified microfibrillated cellulose is preferably 2 nm or larger. The average fiber diameter of 2 nm or larger is advantageous in that: the microfibrillated cellulose is less likely to be damaged during chemical modification; the surface texture becomes smooth; and the strength after compounding with the rubber can be improved. The average fiber diameter is more preferably 4 nm or larger, further preferably 10 nm or larger, particularly preferably 20 nm or larger.

The average fiber diameter of the chemically modified microfibrillated cellulose is preferably 1 μm or smaller. The average fiber diameter of 1 μm or smaller is advantageous in that: the compatibility between the rubber and the chemically modified microfibrillated cellulose is particularly good and a significant effect is made in reducing energy loss at the interface between the rubber and the chemically modified microfibrillated cellulose; a higher reinforcing effect can be produced due to the improved elastic modulus; and the compatibility with the rubber can be improved by virtue of the chemically modified surface. The average fiber diameter is more preferably 500 nm or smaller, further preferably 200 nm or smaller, particularly preferably 100 nm or smaller.

When the chemically modified microfibrillated cellulose is a combination of two or more types, the average fiber diameter is calculated as the average of the whole chemically modified microfibrillated celluloses.

The average fiber diameter can be measured by image analysis using scanning electron micrographs, image analysis using transmission electron micrographs, X-ray scattering data analysis, or the like.

In the present invention, the chemically modified microfibrillated cellulose is essentially used. The chemically modified microfibrillated cellulose may be used in combination with a non-chemically-modified microfibrillated cellulose (e.g. the microfibrillated cellulose to be used as a starting material for the chemically modified microfibrillated cellulose in the present invention) to an extent that does not impair the effects of the present invention.

The amount of the chemically modified microfibrillated cellulose per 100 parts by mass of the rubber component is preferably in the range of 0.5 to 10 parts by mass. When the amount of the chemically modified microfibrillated cellulose is 0.5 parts by mass or larger, the addition of the chemically modified microfibrillated cellulose produces a particularly good reinforcing effect and effect of improvement of elastic modulus. The amount of 10 parts by mass or smaller is advantageous in that the dispersibility of the chemically modified microfibrillated cellulose in the rubber is less likely to be deteriorated. The amount of the chemically modified microfibrillated cellulose per 100 parts by mass of the rubber component is more preferably 0.7 parts by mass or larger, further preferably 1 part by mass or larger, while it is more preferably 7 parts by mass or smaller, further preferably 5 parts by mass or smaller.

The chemically modified microfibrillated cellulose is obtained by the modification of the starting microfibrillated cellulose mentioned above with a modifying agent.

Examples of the modifying agent include compounds represented by the following formula (3):

$$R^1\text{-A-B} \quad (3)$$

wherein $R^1$ is as defined for $R^1$ in the formula (1), A represents a carbonyl group (—CO—), and B represents a leaving group.

Examples of B in the formula (3) include halogen atoms, a hydroxy group, and functional groups represented by the following formula (4):

$$-\text{OCOR}^3 \quad (4)$$

wherein $R^3$ represents a group as defined for $R^1$ in the formula (1) or an alkyl group having 1 to 5 carbon atoms, preferably 1 to 3 carbon atoms.

Specific examples of the modifying agent represented by the formula (3) include unsaturated aliphatic carboxylic acids, including: mono-unsaturated aliphatic carboxylic acids such as crotonic acid, myristoleic acid, palmitoleic acid, oleic acid, elaidic acid, vaccenic acid, gadoleic acid, eicosenoic acid, erucic acid, and nervonic acid; di-unsaturated aliphatic carboxylic acids such as sorbic acid, linoleic acid, eicosadienoic acid, and docosadienoic acid; tri-unsaturated aliphatic carboxylic acids such as linolenic acid, pinolenic acid, eleostearic acid, dihomo-γ-linolenic acid, and eicosatrienoic acid; tetra-unsaturated aliphatic carboxylic acids such as stearidonic acid, arachidonic acid, eicosatetraenoic acid, and adrenic acid; penta-unsaturated aliphatic carboxylic acids such as bosseopentaenoic acid, eicosapentaenoic acid, osbond acid, clupanodonic acid, and tetracosapentaenoic acid; and hexa-unsaturated aliphatic carboxylic acids such as docosahexaenoic acid and nisinic acid, as well as acid halides and acid anhydrides of these unsaturated aliphatic carboxylic acids.

When the modifying agent represented by the formula (3) and the microfibrillated cellulose are reacted with each other, part of Lhe hydroxyl hydrogen atoms of the cellulose forming the microfibrillated cellulose is replaced with the substituent represented by the formula (1).

The amount of the modifying agent used to modify the microfibrillated cellulose with the modifying agent represented by the formula (3) is preferably 0.1 to 20 mol, more preferably 0.4 to 10 mol per mole of glucose unit of the microfibrillated cellulose.

The reaction between the modifying agent and the microfibrillated cellulose may be carried out by adding an excess of the modifying agent to the microfibrillated cellulose and reacting them until a predetermined degree of substitution is obtained, followed by the termination of the reaction, or may be carried out by adding the minimum necessary amount of the modifying agent to the microfibrillated cellulose and controlling reaction time, temperature, the amount of catalyst, or the like to react them until a predetermined degree of substitution is obtained.

The chemically modified microfibrillated cellulose obtained by modification with the modifying agent represented by the formula (3) may be further modified, if necessary, with a modifying agent represented by the following formula (5):

$$R^2\text{-A-B} \quad (5)$$

wherein $R^2$ is as defined for $R^2$ in the formula (2), A represents a carbonyl group (—CO—), and B represents a leaving group. This can further improve the hydrophobicity of the chemically modified microfibrillated cellulose.

When the modifying agent represented by the formula (5) and the chemically modified microfibrillated cellulose are reacted with each other, the remaining hydroxyl hydrogen atoms of the cellulose forming the chemically modified microfibrillated cellulose are replaced with the substituent represented by the formula (2).

The reaction for modifying the microfibrillated cellulose with the modifying agent can be allowed to proceed to some extent by heating, even without the use of a catalyst, as long as dehydration is adequately conducted. The use of a catalyst is preferred because the microfibrillated cellulose can be modified with high efficiency under milder conditions.

Examples of the catalyst used in the modification of the microfibrillated cellulose include: acid catalysts such as hydrochloric acid, sulfuric acid, and acetic acid; alkali catalysts such as powdery potassium carbonate and sodium carbonate; and amine catalysts, including pyridine compounds such as pyridine and dimethylaminopyridine (DMAP) and noncyclic or cyclic tertiary amine compounds such as triethylamine, trimethylamine, and diazabicyclooctane. Since such an acid catalyst is usually used in the form of an aqueous solution, the addition of the acid catalyst may cause the acid hydrolysis of the microfibrillated cellulose, in addition to the esterification reaction. In this respect, alkali catalysts or amine catalysts are preferred. In view of catalytic activity, amine catalysts are more preferred, and pyridine, DMAP, or diazabicyclooctane is further preferred. These catalysts may be used alone or in combinations of two or more thereof. Exemplary embodiments may include combinations of alkali catalysts and amine catalysts.

The amount of the catalyst may be equimolar to or more than the amount of the modifying agent as described above. For example, when a liquid amine compound such as pyridine is used as the catalyst, it may be used in a larger amount to serve as both the catalyst and solvent. The amount of the catalyst is, for example, preferably 0.1 to 10 mol per mole of glucose unit of the microfibrillated cellulose. The reaction may be carried out, for example, by adding an excess of the catalyst to the microfibrillated cellulose and reacting them until a predetermined degree of substitution is obtained, followed by the termination of the reaction, or may be carried out by adding the minimum necessary amount of the catalyst to the microfibrillated cellulose and controlling reaction time, temperature, or the like to react them until a predetermined degree of substitution is obtained. After the reaction, the catalyst is usually preferably removed by washing, distillation, or the like.

The reaction temperature during the modification of the microfibrillated cellulose with the modifying agent is preferably 20 to 160° C., more preferably 25 to 120° C., further preferably 30 to 100° C. A higher temperature is more preferred because the efficiency of the reaction for modifying the microfibrillated cellulose is enhanced. Too high a temperature, however, may partially degrade the microfibrillated cellulose. Hence, the temperature range as described above is preferred.

The reaction between the modifying agent and the microfibrillated cellulose may be carried out in water, which however greatly reduces the reaction efficiency. Thus, the reaction is preferably carried out in a nonaqueous solvent. The nonaqueous solvent is preferably an organic solvent that does not react with the modifying agent. Examples include: halogenated solvents such as methylene chloride, chloroform, and carbon tetrachloride; ketone solvents such as acetone and methyl ethyl ketone (MEK); ether solvents such as tetrahydrofuran (THF), and dimethylation or diethylation products of ethylene glycol, propylene glycol, and ethers such as polyethylene glycol; amide solvents such as dimethylformamide, dimethylacetamide, and N-methylpyrrolidone; nonpolar solvents such as hexane, heptane, benzene, and toluene; and mixed solvents thereof.

<Carbon Black>

The rubber composition of the present invention contains carbon black. The addition of carbon black produces a reinforcing effect. In addition, surprisingly, the combined use of the chemically modified microfibrillated cellulose and carbon black can synergistically and markedly improve the dispersibility of the chemically modified microfibrillated cellulose in the rubber composition.

Examples of the carbon black include, but are not limited to, GPF, FEF, HAF, ISAF, and SAF. These carbon blacks may be used alone or in combinations of two or more thereof.

The nitrogen adsorption specific surface area ($N_2SA$) of the carbon black is preferably 20 $m^2/g$ or larger, more preferably 25 $m^2/g$ or larger. Also, the $N_2SA$ is preferably 200 $m^2/g$ or smaller, more preferably 150 $m^2/g$ or smaller, further preferably 120 $m^2/g$ or smaller. Carbon black having a $N_2SA$ of smaller than 20 $m^2/g$ tends to produce an insufficient reinforcing effect. Carbon black having a $N_2SA$ exceeding 200 $m^2/g$ tends to reduce fuel economy.

In the present invention, the nitrogen adsorption specific surface area of the carbon black is determined by Method A of JIS K6217.

The amount of the carbon black per 100 parts by mass of the rubber component is preferably 5 parts by mass or larger, more preferably 10 parts by mass or larger. The amount of the carbon black is preferably 200 parts by mass or smaller, more preferably 150 parts by mass or smaller, further preferably 100 parts by mass or smaller, particularly preferably 70 parts by mass or smaller. Within the range described above, good fuel economy is obtained.

<Other Compounding Agents>

The rubber composition of the present invention may contain, in addition to the components described above, other compounding agents conventionally used in the rubber industry, for example, a white filler such as silica, a silane coupling agent, a vulcanizing agent, a vulcanization accelerator, a vulcanization activator, an oil, a curable resin, a wax, and/or an antioxidant.

<Method for Producing Rubber Composition>

The rubber composition of the present invention can be obtained by mixing the rubber component, the chemically modified microfibrillated cellulose, carbon black, and other necessary compounding agents by, for example, a method conventionally known in the art using a rubber kneading machine or the like and vulcanizing the mixture by a method conventionally known in the art.

<Tire>

The present invention also provides a tire including a component prepared using the rubber composition of the present invention as mentioned above. Examples of the tire include pneumatic tires, studless winter tires, and run-flat tires.

In the tire of the present invention, the content ratio of petroleum resource-derived components is further reduced at least in the component to which the rubber composition of the present invention has been applied. Thus, the tire of the present invention gives due consideration to resource savings and environmental protection. Moreover, since a rubber composition providing excellent breaking properties and low energy loss is used at least in the component to which the rubber composition of the present invention has been applied, the tire of the present invention is an "eco tire" that is earth conscious, and also has good rolling resistance properties and durability.

When the tire of the present invention is a pneumatic tire, examples of the component to which the rubber composition of the present invention can be applied include sidewalls, base treads, bead apices, clinch apices, innerliners, undertreads, breaker toppings, ply toppings, and treads.

Thus, the rubber composition of the present invention can be suitably used in these components of the pneumatic tire.

The base tread refers to an inner layer portion of a tread having a multilayered structure and is an inner surface layer in a tread having a two-layer structure [outer surface layer (cap tread) and inner surface layer (base tread)]. The base tread is specifically a component shown in, for example, FIG. 1 of JP 2008-285628 A or FIG. 1 of JP 2008-303360 A, all of which are included herein by reference.

The bead apex refers to a component placed inside of a tire clinch so as to extend radially outward from a bead core and is specifically a component shown in, for example, FIGS. 1 to 3 of JP 2008-38140 A, or FIG. 1 of JP 2004-339287 A, all of which are included herein by reference.

The clinch apex refers to a rubber portion placed at the inner end of a sidewall and is specifically a component shown in, for example, FIG. 1 of JP 2008-75066 A or FIG. 1 of JP 2004-106796 A, all of which are included herein by reference.

The innerliner refers to a component forming a tire lumen surface. This component can reduce the amount of air permeation and maintain the internal pressure of the tire. The innerliner is specifically a component shown in, for example, FIG. 1 of JP 2008-291091 A, or FIGS. 1 and 2 of JP 2007-160980 A, all of which are included herein by reference.

The undertread refers to a component positioned between a tread rubber and a breaker (belt) rubber to cover the portion on the tire surface side of the breaker rubber and is specifically a component shown in, for example, FIG. 1 of JP 2009-191132 A, which is included herein by reference.

The breaker topping is used as a steel cord topping. Examples of the steel cord include 1×n single strand steel cords and k+m layer strand steel cords (for example, n represents an integer of 1 to 27, k represents an integer of 1 to 10, and m represents an integer of 1 to 3). The breaker topping is used in a breaker placed inside of a tread and radially outside of a carcass. The breaker topping may specifically be used in breakers shown in FIG. 3 of JP 2003-94918 A, FIG. 1 of JP 2004-67027 A, or FIGS. 1 to 4 of JP H04-356205 A, all of which are included herein by reference, or the like.

The ply topping refers to a component covering cords in a carcass ply or a belt ply.

Next, the components included in the pneumatic tire of the present invention will be described.

<Sidewall>

When the rubber composition of the present invention is applied to a sidewall, the rubber component as described above can be used. The rubber component preferably includes natural rubber and polybutadiene rubber (BR) from the standpoint of obtaining good flex crack growth resistance.

The amount of the natural rubber based on 100% by mass of the rubber component is preferably 5% by mass or more, more preferably 20% by mass or more, further preferably 30% by mass or more. If the amount is less than 5% by mass, excellent fuel economy might not be obtained. Also, the amount of the natural rubber is preferably 80% by mass or less, more preferably 60% by mass or less, further preferably 50% by mass or less. If the amount exceeds 80% by mass, flex crack growth resistance might be reduced.

The BR is not particularly limited, and BR generally known in the tire industry can be used. For example, polybutadiene rubber having a high cis content such as BR1220 manufactured by Zeon Corp., and BR130B and BR150B manufactured by Ube Industries, Ltd., modified polybutadiene rubber such as BR1250H manufactured by Zeon Corp., polybutadiene rubber containing syndiotactic polybutadiene crystals such as VCR412 and VCR617 manufactured by Ube Industries, Ltd., or polybutadiene rubber synthesized using a rare earth catalyst such as BUNA-CB25 manufactured by LANXESS may be used. These BRs may be used alone or in combinations of two or more thereof.

The cis content in the BR is preferably 70% by mass or more, more preferably 90% by mass or more, further preferably 97% by mass or more.

In the present invention, the cis content (percentage of cis-1,4 linkages) in the BR can be measured by infrared absorption spectrometry.

The molecular weight distribution (Mw/Mn) of the BR is preferably 1.5 or higher, more preferably 2.0 or higher. If the Mw/Mn is lower than 1.5, processability might be deteriorated. The Mw/Mn of the BR is preferably 5.0 or lower, more preferably 4.0 or lower. If the Mw/Mn exceeds 5.0, flex crack growth resistance tends to be deteriorated.

In the present invention, the number-average molecular weight (Mn) and the weight-average molecular weight (Mw) are determined using gel permeation chromatography (GPC) relative to polystyrene standards.

The Mooney viscosity ($ML_{1+4}$ (100° C.)) of the BR is preferably 10 or higher, more preferably 30 or higher. If the Mooney viscosity is lower than 10, the dispersibility of filler tends to be reduced. The Mooney viscosity is preferably 120 or lower, more preferably 80 or lower. If the Mooney viscosity exceeds 120, rubber scorch (discoloration) might occur during extrusion processing.

In the present invention, the Mooney viscosity of the BR is measured according to ISO289 or JIS K6300.

The amount of the BR based on 100% by mass of the rubber component is preferably 30% by mass or more, more preferably 40% by mass or more, further preferably 50% by mass or more, from the standpoint of achieving necessary fuel economy or flex crack growth resistance. Also, the amount of the BR is preferably 90% by mass or less, more preferably 80% by mass or less, further preferably 70% by mass or less, from the standpoint of processability.

When the rubber composition of the present invention is applied to a sidewall, the chemically modified microfibrillated cellulose used may be as described above and can be used in the amount as described above.

When the rubber composition of the present invention is applied to a sidewall, examples of the carbon black used include, but are not limited to, GPF, FEF, HAF, ISAF, and SAF. These carbon blacks may be used alone or in combinations of two or more thereof.

The nitrogen adsorption specific surface area ($N_2SA$) of the carbon black is preferably 20 $m^2/g$ or larger, more preferably 30 $m^2/g$ or larger. Also, the $N_2SA$ is preferably 200 $m^2/g$ or smaller, more preferably 150 $m^2/g$ or smaller, further preferably 100 $m^2/g$ or smaller. Carbon black having a $N_2SA$ of smaller than 20 $m^2/g$ tends to produce an insufficient reinforcing effect. Carbon black having a $N_2SA$ exceeding 200 $m^2/g$ tends to reduce fuel economy.

The amount of the carbon black per 100 parts by mass of the rubber component is preferably 1 part by mass or larger, more preferably 2 parts by mass or larger. The amount of the carbon black is preferably 150 parts by mass or smaller, more preferably 100 parts by mass or smaller. Within the range described above, good fuel economy and good flex crack growth resistance are obtained.

When the rubber composition of the present invention is applied to a sidewall, the rubber composition of the present invention may contain a white filler. Examples of the white filler that can be used include those commonly used in the rubber industry, for example, silica, calcium carbonate, mica (e.g. sericite), aluminum hydroxide, magnesium oxide, magnesium hydroxide, clay, talc, alumina, and titanium oxide. Silica is preferred from the standpoint of fuel economy.

Examples of the silica include, but are not limited to, dry process silica (silicic anhydride) and wet process silica (hydrous silicic acid). Wet process silica is preferred because this silica is rich in silanol groups.

The nitrogen adsorption specific surface area ($N_2SA$) of the silica is preferably 40 $m^2/g$ or larger, more preferably 50 $m^2/g$ or larger. If the $N_2SA$ is smaller than 40 $m^2/g$, breaking strength after vulcanization tends to be reduced. Also, the $N_2SA$ of the silica is preferably 300 $m^2/g$ or smaller, more preferably 250 $m^2/g$ or smaller. If the $N_2SA$ exceeds 300 $m^2/g$, low heat build-up properties or rubber processability tends to be reduced.

In the present invention, the nitrogen adsorption specific surface area of the silica is measured by the BET method according to ASTM D3037-93.

The amount of the white filler (particularly, silica) per 100 parts by mass of the rubber component is preferably 10 parts by mass or larger, more preferably 20 parts by mass or larger. Also, the amount is preferably 120 parts by mass or smaller, more preferably 100 parts by mass or smaller. Within the range described above, good fuel economy and good flex crack growth resistance are obtained.

When the rubber composition of the present invention is applied to a sidewall, the rubber composition containing silica preferably further contains a silane coupling agent. Examples of the silane coupling agent include, but are not limited to: sulfide silane coupling agents such as bis(3-triethoxysilylpropyl)disulfide and bis(3-triethoxysilylpropyl)tetrasulfide; mercapto silane coupling agents such as 3-mercaptopropyltrimethoxysilane and 3-mercaptopropyltriethoxysilane; vinyl silane coupling agents such as vinyltriethoxysilane; amino silane coupling agents such as 3-aminopropyltriethoxysilane; glycidoxy silane coupling agents such as γ-glycidoxypropyltriethoxysilane; nitro silane coupling agents such as 3-nitropropyltrimethoxysilane; and chloro silane coupling agents such as 3-chloropropyltrimethoxysilane. Each of these silane coupling agents may be used alone, or two or more thereof may be used in combination.

The amount of the silane coupling agent per 100 parts by mass of silica is preferably 0.5 parts by mass or larger, more preferably 1.5 parts by mass or larger, further preferably 2.5 parts by mass or larger. The silane coupling agent contained at smaller than 0.5 parts by mass might have difficulty in dispersing silica well. Also, the amount of the silane coupling agent is preferably 20 parts by mass or smaller, more preferably 15 parts by mass or smaller, further preferably 10 parts by mass or smaller. The silane coupling agent contained at larger than 20 parts by mass tends not to be effective for further improving the dispersion of silica and thereby to increase unnecessary cost. In addition, scorch time is shortened and processability during kneading or extrusion tends to be reduced.

When the rubber composition of the present invention is applied to a sidewall, the rubber composition of the present invention preferably contains an oil as a plasticizer. This can adjust the hardness to an appropriately low level to give good processability. Examples of the oil that can be used include, but are not limited to, oils conventionally known in the art, including process oils such as paraffinic process oil, aromatic process oil, and naphthenic process oil, vegetable fats and oils, and mixtures thereof.

The amount of the oil per 100 parts by mass of the rubber component is preferably 1 part by mass or larger, more preferably 2 parts by mass or larger. Also, the amount of the oil is preferably 15 parts by mass or smaller, more preferably 10 parts by mass or smaller. Within the range described above, good processability is imparted and excellent fuel economy and excellent flex crack growth resistance are also obtained.

When the rubber composition of the present invention is applied to a sidewall, the rubber composition of the present invention may appropriately contain, in addition to the materials described above, various materials commonly used in the tire industry, such as zinc oxide, stearic acid, various antioxidants, plasticizers (wax, etc.) other than oil, vulcanizing agents (sulfur, organic peroxides, etc.), and vulcanization accelerators (sulfenamide and guanidine vulcanization accelerators, etc.).

<Base Tread>

When the rubber composition of the present invention is applied to a base tread, the rubber component as described above can be used. The rubber component preferably includes natural rubber and polybutadiene rubber (BR) from the standpoint of obtaining good fuel economy and good handling stability.

The amount of the natural rubber based on 100% by mass of the rubber component is preferably 5% by mass or more, more preferably 30% by mass or more, further preferably 50% by mass or more, particularly preferably 60% by mass or more. If the amount is less than 5% by mass, excellent fuel economy might not be obtained. Also, the amount of the natural rubber is preferably 90% by mass or less, more preferably 80% by mass or less, further preferably 75% by mass or less. If the amount exceeds 90% by mass, handling stability might be reduced.

The BR may be as described for the BR used when the rubber composition of the present invention is applied to a sidewall.

The amount of the BR based on 100% by mass of the rubber component is preferably 10% by mass or more, more preferably 20% by mass or more, from the standpoint of achieving necessary fuel economy or handling stability. Also, the amount of the BR is preferably 70% by mass or less, more preferably 50% by mass or less, further preferably 40% by mass or less, from the standpoint of processability.

When the rubber composition of the present invention is applied to a base tread, the chemically modified microfibrillated cellulose used may be as described above and can be used in the amount as described above.

When the rubber composition of the present invention is applied to a base tread, the carbon black used may be as described for the case where the rubber composition of the present invention is applied to a sidewall.

The amount of the carbon black per 100 parts by mass of the rubber component is preferably 1 part by mass or larger, more preferably 2 parts by mass or larger. The amount of the carbon black is preferably 150 parts by mass or smaller, more preferably 100 parts by mass or smaller. Within the range described above, good fuel economy and good handling stability are obtained.

When the rubber composition of the present invention is applied to a base tread, the rubber composition of the present invention may contain a white filler. The white filler may be as described for the case where the rubber composition of the present invention is applied to a sidewall. Moreover, the amount of the white filler is also the same as described for the case where the rubber composition of the present invention is applied to a sidewall.

When the rubber composition of the present invention is applied to a base tread, the rubber composition of the present invention preferably contains an oil as a plasticizer. This can adjust the hardness to an appropriately low level to give good processability. Examples of the oil that can be used include, but are not limited to, oils conventionally known in the art, including process oils such as paraffinic process oil, aromatic process oil, and naphthenic process oil, vegetable fats and oils, and mixtures thereof.

The amount of the oil per 100 parts by mass of the rubber component is preferably 1 part by mass or larger, more preferably 2 parts by mass or larger. Also, the amount of the oil is preferably 15 parts by mass or smaller, more preferably 10 parts by mass or smaller. Within the range described above, good processability is imparted and excellent fuel economy and excellent handling stability are also obtained.

When the rubber composition of the present invention is applied to a base tread, the rubber composition of the present invention may appropriately contain, in addition to the materials described above, various materials commonly used in the tire industry, such as silane coupling agents, zinc oxide, stearic acid, various antioxidants, plasticizers (wax, etc.) other than oil, vulcanizing agents (sulfur, organic peroxides, etc.), and vulcanization accelerators (sulfenamide and guanidine vulcanization accelerators, etc.).

<Bead Apex>

When the rubber composition of the present invention is applied to a bead apex, the rubber component as described above can be used. The rubber component preferably includes natural rubber and styrene-butadiene rubber (SBR) because of being advantageous in terms of cost and ensuring adhesion to adjacent components.

The amount of the natural rubber based on 100% by mass of the rubber component is preferably 5% by mass or more, more preferably 10% by mass or more, further preferably 30% by mass or more, particularly preferably 50% by mass or more. If the amount is less than 5% by mass, excellent fuel economy or rubber strength might not be obtained. The upper limit of the amount of the natural rubber is not particularly limited and is preferably 90% by mass or less, more preferably 80% by mass or less.

Examples of the SBR that can be used include, but are not limited to, emulsion-polymerized styrene-butadiene rubber (E-SBR), solution-polymerized styrene-butadiene rubber (S-SBR), and modified SBR thereof. Among them, E-SBR is preferred because then the carbon black can be dispersed well and good processability is attained.

Examples of the modified SBR include SBR modified at its chain end and/or backbone, and modified SBR coupled with a tin or silicon compound or the like (condensates, branched ones, etc.).

The styrene content in the SBR is preferably 5% by mass or more, more preferably 10% by mass or more, further preferably 20% by mass or more. If the styrene content is less than 5% by mass, sufficient grip performance or rubber strength might not be obtained. Also, the styrene content is preferably 60% by mass or less, more preferably 50% by mass or less, further preferably 30% by mass or less. If the styrene content exceeds 60% by mass, excellent fuel economy might not be obtained.

In the present invention, the styrene content in the SBR is calculated by $^1$H-NMR analysis.

The vinyl content in the SBR is preferably 10% by mass or more, more preferably 15% by mass or more. If the vinyl content is less than 10% by mass, sufficient hardness, grip performance, or rubber strength might not be obtained. The vinyl content is preferably 65% by mass or less, more preferably 60% by mass or less, further preferably 30% by mass or less, particularly preferably 25% by mass or less. If the vinyl content exceeds 65% by mass, grip performance, durability, or abrasion resistance might be deteriorated.

In the present invention, the vinyl content (amount of 1,2-butadiene units) in the SBR can be measured by infrared absorption spectrometry or $^1$H-NMR.

The Mooney viscosity ($ML_{1+4}$ (100° C.)) of the SBR is preferably 35 or higher, more preferably 45 or higher, further preferably 50 or higher. If the Mooney viscosity is lower than 35, the resulting unvulcanized rubber composition might have low viscosity and thus be unable to ensure a proper thickness after vulcanization. The Mooney viscosity is preferably 65 or lower, more preferably 60 or lower. If the Mooney viscosity exceeds 65, the resulting unvulcanized rubber composition might become too hard and thus be difficult to extrude with smooth edges.

In the present invention, the Mooney viscosity of the SBR is measured according to ISO289 or JIS K6300.

The amount of the SBR based on 100% by mass of the rubber component is preferably 5% by mass or more, more preferably 10% by mass or more, further preferably 15% by mass or more. The amount of the SBR is preferably 95% by mass or less, more preferably 60% by mass or less, further preferably 55% by mass or less, particularly preferably 50% by mass or less. When the amount of the SBR falls within the range described above, good fuel economy and good processability are obtained.

The combined amount of the natural rubber and the SBR based on 100% by mass of the rubber component is preferably 80% by mass or more, more preferably 100% by mass. When the combined amount falls within the range described above, excellent fuel economy, excellent processability and cost advantages are obtained.

When the rubber composition of the present invention is applied to a bead apex, the chemically modified microfibrillated cellulose used may be as described above and can be used in the amount as described above.

When the rubber composition of the present invention is applied to a bead apex, examples of the carbon black used include, but are not limited to, GPF, FEF, HAF, ISAF; and SAF. These carbon blacks may be used alone or in combinations of two or more thereof.

The nitrogen adsorption specific surface area ($N_2SA$) of the carbon black is preferably 10 m$^2$/g or larger, more preferably 30 m$^2$/g or larger, further preferably 50 m$^2$/g or larger. Also, the $N_2SA$ is preferably 250 m$^2$/g or smaller, more preferably 150 m$^2$/g or smaller, further preferably 100 m$^2$/g or smaller. If the $N_2SA$ is smaller than 10 m$^2$/g, sufficient adhesion or rubber strength might not be obtained. If the $N_2SA$ exceeds 250 m$^2$/g, the unvulcanized viscosity tends to become very high and thereby deteriorate processability, and fuel economy also tends to be deteriorated.

The amount of the carbon black per 100 parts by mass of the rubber component is preferably 5 parts by mass or larger, more preferably 20 parts by mass or larger, further preferably 40 parts by mass or larger. The amount of the carbon black is preferably 100 parts by mass or smaller, more preferably 80 parts by mass or smaller, further preferably 70 parts by mass or smaller. If the amount is smaller than 5 parts by mass, sufficient adhesion or rubber strength might not be obtained. If the amount exceeds 100 parts by mass, dispersibility or processability tends to be deteriorated.

When the rubber composition of the present invention is applied to a bead apex, the rubber composition of the present invention may contain a white filler. The white filler may be as described for the case where the rubber composition of the present invention is applied to a sidewall. Moreover, the amount of the white filler is also the same as described for the case where the rubber composition of the present invention is applied to a sidewall.

When the rubber composition of the present invention is applied to a bead apex, the rubber composition of the present invention preferably contains zinc oxide. The addition of zinc oxide is effective for suppressing reversion and accelerating vulcanization.

The amount of the zinc oxide per 100 parts by mass of the rubber component is preferably 2 parts by mass or larger, more preferably 3 parts by mass or larger. Also, the amount of the zinc oxide is preferably 15 parts by mass or smaller, more preferably 10 parts by mass or smaller. The zinc oxide contained at smaller than 2 parts by mass might be less effective as a vulcanization accelerator. If the amount exceeds 15 parts by mass, rubber strength might be reduced.

When the rubber composition of the present invention is applied to a bead apex, the rubber composition of the present invention may appropriately contain, in addition to the materials described above, various materials commonly used in the tire industry, such as silane coupling agents, resins, plasticizers (oils, etc.), stearic acid, various antioxidants, vulcanizing agents (sulfur, etc.), and vulcanization accelerators.

Examples of the resin include phenol-based resins and cresol-based resins. Among them, phenol-based resins are preferred. Examples of the phenol-based resin include: phenol resins obtained by the reaction of phenols with aldehydes such as formaldehyde, acetaldehyde, or furfural; and modified phenol resins obtained by modification using cashew oil, tall oil, linseed oil, various animal or plant oils, unsaturated fatty acids, rosin, alkyl benzene resins, aniline, melamine, or the like. Among them, modified phenol resins are preferred, and cashew oil-modified phenol resins are particularly preferred, because hardness can be improved.

When a resin is added, the amount of the resin per 100 parts by mass of the rubber component is preferably 1 part by mass or larger, more preferably 5 parts by mass or larger, from the standpoint of obtaining sufficient hardness. Also, the amount of the resin is preferably 30 parts by mass or smaller, more preferably 20 parts by mass or smaller, from the standpoint of giving excellent processability.

<Clinch Apex>

When the rubber composition of the present invention is applied to a clinch apex, the rubber component as described above can be used. The rubber component preferably includes natural rubber and polybutadiene rubber (BR) from the standpoint of abrasion resistance and fuel economy.

The amount of the natural rubber based on 100% by mass of the rubber component is preferably 5% by mass or more, more preferably 10% by mass or more, further preferably 30% by mass or more. If the amount is less than 5% by mass, excellent fuel economy or rubber strength might not be obtained. The upper limit of the amount of the natural rubber is not particularly limited and is preferably 90% by mass or less, more preferably 70% by mass or less.

The BR may be as described for the BR used when the rubber composition of the present invention is applied to a sidewall.

The amount of the BR based on 100% by mass of the rubber component is preferably 5% by mass or more, more preferably 10% by mass or more, further preferably 30% by mass or more. The amount of the BR is preferably 80% by mass or less, more preferably 70% by mass or less, further preferably 60% by mass or less. If the amount is less than 5% by mass, abrasion resistance might be deteriorated. If the amount exceeds 80% by mass, processability tends to be deteriorated.

The combined amount of the natural rubber and the BR based on 100% by mass of the rubber component is preferably 80% by mass or more, more preferably 100% by mass. When the combined amount falls within the range described above, excellent fuel economy and excellent processability are obtained.

When the rubber composition of the present invention is applied to a clinch apex, the chemically modified microfibrillated cellulose used may be as described above and can be used in the amount as described above.

When the rubber composition of the present invention is applied to a clinch apex, the carbon black used may be as described for the case where the rubber composition of the present invention is applied to a bead apex.

The amount of the carbon black per 100 parts by mass of the rubber component is preferably 5 parts by mass or larger, more preferably 20 parts by mass or larger, further preferably 40 parts by mass or larger. The amount of the carbon black is preferably 100 parts by mass or smaller, more preferably 80 parts by mass or smaller, further preferably 70 parts by mass or smaller. If the amount is smaller than 5 parts by mass, sufficient abrasion resistance, adhesion, or rubber strength might not be obtained. If the amount exceeds 100 parts by mass, dispersibility or processability tends to be deteriorated.

When the rubber composition of the present invention is applied to a clinch apex, the rubber composition of the present invention may contain a white filler. The white filler may be as described for the case where the rubber composition of the present invention is applied to a sidewall. Moreover, the amount of the white filler is also the same as described for the case where the rubber composition of the present invention is applied to a sidewall.

When the rubber composition of the present invention is applied to a clinch apex, the rubber composition of the present invention may appropriately contain, in addition to the materials described above, various materials commonly used in the tire industry, such as silane coupling agents, plasticizers (oil, wax, etc.), zinc oxide, stearic acid, various antioxidants, vulcanizing agents (sulfur, etc.), and vulcanization accelerators.

<Innerliner>

When the rubber composition of the present invention is applied to an innerliner, the rubber component as described above can be used. The rubber component preferably includes natural rubber and a butyl-based rubber from the standpoint of obtaining good air permeation resistance.

The amount of the natural rubber based on 100% by mass of the rubber component is preferably 5% by mass or more, more preferably 10% by mass or more, further preferably 20% by mass or more. If the amount is less than 5% by mass, excellent fuel economy or rubber strength might not be obtained. The upper limit of the amount of the natural rubber is not particularly limited and is preferably 70% by mass or less, more preferably 50% by mass or less, further preferably 40% by mass or less.

Examples of the butyl-based rubber include halogenated butyl rubbers (X-IIR) such as brominated butyl rubber (Br-IIR) or chlorinated butyl rubber (Cl-IIR) and butyl rubber (IIR). These butyl-based rubbers may be used alone or in combinations of two or more thereof. Among them, X-IIR such as Cl-IIR is preferably used from the standpoint of low heat build-up properties.

The amount of the butyl-based rubber based on 100% by mass of the rubber component is preferably 50% by mass or more, more preferably 60% by mass or more, further preferably 70% by mass or more. If the amount is less than 50% by mass, excellent air permeation resistance might not be obtained. Also, the amount of the butyl-based rubber is preferably 99% by mass or less, more preferably 90% by mass or less, further preferably 80% by mass or less. If the amount exceeds 99% by mass, good fuel economy might not be obtained.

When the rubber composition of the present invention is applied to an innerliner, epoxidized natural rubber (ENR) is also preferably included in the rubber component, from the standpoint of fuel economy and resource protection.

Commercially available ENR may be used, or NR may be epoxidized and used. NR may be epoxidized by any method, including, for example, a chlorohydrin method, a direct oxidation method, a hydrogen peroxide method, an alkyl hydroperoxide method, and a peracid method. The peracid method may, for example, involve reacting an emulsion of natural rubber with an organic peracid such as peracetic acid or performic acid as an epoxidizing agent.

The degree of epoxidation of the ENR is preferably 1 to 85% by mol. ENR having a degree of epoxidation of less than 1% by mol tends to be low effective for improving the rubber composition. Also, if the degree of epoxidation exceeds 85% by mol, the polymer in the rubber composition tends to be gelled.

As used herein, the degree of epoxidation means the ratio of the number of epoxidized carbon-carbon double bonds to the total number of carbon-carbon double bonds in unepoxidized natural rubber and is determined by, for example, titration analysis or nuclear magnetic resonance (NMR) analysis.

When ENR is added, the amount of the ENR based on 100% by mass of the rubber component is preferably 10% by mass or more, more preferably 20% by mass or more. Also, the amount of the ENR is preferably 99% by mass or less, more preferably 90% by mass or less, further preferably 70% by mass or less. The ENR contained at less than 10% by mass tends to be less effective for dispersing filler in the rubber composition. If the amount exceeds 99% by mass, good processability or breaking strength might not be obtained.

When the rubber composition of the present invention is applied to an innerliner, the chemically modified microfibrillated cellulose used may be as described above and can be used in the amount as described above.

When the rubber composition of the present invention is applied to an innerliner, examples of the carbon black used include, but are not limited to, GPF, FEF, HAF, ISAF, and SAF. These carbon blacks may be used alone or in combinations of two or more thereof.

The nitrogen adsorption specific surface area ($N_2SA$) of the carbon black is preferably 10 $m^2/g$ or larger, more preferably 20 $m^2/g$ or larger, further preferably 23 $m^2/g$ or larger. Also, the $N_2SA$ is preferably 250 $m^2/g$ or smaller, more preferably 100 $m^2/g$ or smaller, further preferably 50 $m^2/g$ or smaller, particularly preferably 35 $m^2/g$ or smaller. If the $N_2SA$ is smaller than 10 $m^2/g$, sufficient adhesion or rubber strength might not be obtained. If the $N_2SA$ exceeds 250 $m^2/g$, the unvulcanized viscosity tends to become very high and thereby deteriorate processability, and fuel economy also tends to be deteriorated.

The amount of the carbon black per 100 parts by mass of the rubber component is preferably 5 parts by mass or larger, more preferably 20 parts by mass or larger, further preferably 30 parts by mass or larger. The amount of the carbon black is preferably 100 parts by mass or smaller, more preferably 80 parts by mass or smaller, further preferably 60 parts by mass or smaller. If the amount is smaller than 5 parts by mass, sufficient abrasion resistance, adhesion, or rubber strength might not be obtained. If the amount exceeds 100 parts by mass, dispersibility or processability tends to be deteriorated.

When the rubber composition of the present invention is applied to an innerliner, the rubber composition of the present invention may contain a white filler. The white filler may be as described for the case where the rubber composition of the present invention is applied to a sidewall. Moreover, the amount of the white filler is also the same as described for the case where the rubber composition of the present invention is applied to a sidewall.

When the rubber composition of the present invention is applied to an innerliner, the rubber composition of the present invention may appropriately contain, in addition to the materials described above, various materials commonly used in the tire industry, such as silane coupling agents, plasticizers (oil, wax, etc.), zinc oxide, stearic acid, various antioxidants, vulcanizing agents (sulfur, etc.), and vulcanization accelerators.

<Undertread>

When the rubber composition of the present invention is applied to an undertread, the rubber component as described above can be used. The rubber component preferably includes natural rubber because the natural rubber does not deteriorate the physical properties of the rubber composition of the present invention.

The amount of the natural rubber based on 100% by mass of the rubber component is preferably 30% by mass or more, more preferably 50% by mass or more, further preferably 70% by mass or more. If the amount is less than 30% by mass, excellent fuel economy might not be obtained. The upper limit of the amount of the natural rubber is not particularly limited and may be 100% by mass.

When the rubber composition of the present invention is applied to an undertread, the chemically modified microfibrillated cellulose used may be as described above and can be used in the amount as described above.

When the rubber composition of the present invention is applied to an undertread, the carbon black used may be as described for the case where the rubber composition of the present invention is applied to a bead apex.

The amount of the carbon black per 100 parts by mass of the rubber component is preferably 10 parts by mass or larger, more preferably 30 parts by mass or larger. The amount of the carbon black is preferably 150 parts by mass or smaller, more preferably 100 parts by mass or smaller, further preferably 80 parts by mass or smaller. If the amount is smaller than 10 parts by mass, a sufficient reinforcing effect might not be obtained. If the amount exceeds 150 parts by mass, dispersibility or processability tends to be deteriorated.

When the rubber composition of the present invention is applied to an undertread, the rubber composition of the present invention may contain a white filler. The white filler may be as described for the case where the rubber composition of the present invention is applied to a sidewall. Moreover, the amount of the white filler is also the same as described for the case where the rubber composition of the present invention is applied to a sidewall.

When the rubber composition of the present invention is applied to an undertread, the rubber composition of the present invention preferably contains an oil or a plasticizer other than oil. This can adjust hardness to an appropriately low level to give good processability. Examples of the oil that can be used include paraffinic process oil, aromatic process oil, naphthenic process oil, vegetable fats and oils, and mixtures thereof. The plasticizer is not particularly limited and may be any of those known in the art such as wax.

When the rubber composition of the present invention is applied to an undertread, the rubber composition of the present invention may appropriately contain, in addition to the materials described above, various materials commonly used in the tire industry, such as silane coupling agents, zinc oxide, stearic acid, resins, various antioxidants, vulcanizing agents (sulfur, etc.), and vulcanization accelerators.

<Breaker Topping>

When the rubber composition of the present invention is applied to a breaker topping, the rubber component as described above can be used. The rubber component preferably includes natural rubber because good breaking properties (breaking strength) are obtained.

The amount of the natural rubber based on 100% by mass of the rubber component is preferably 5% by mass or more, more preferably 10% by mass or more, further preferably 20% by mass or more, still further preferably 50% by mass or more, particularly preferably 80% by mass or more. The upper limit thereof is not particularly limited and may be 100% by mass. If the amount is less than 5% by mass, excellent fuel economy or rubber strength might not be obtained.

When the rubber composition of the present invention is applied to a breaker topping, the chemically modified microfibrillated cellulose used may be as described above and can be used in the amount as described above.

When the rubber composition of the present invention is applied to a breaker topping, the carbon black used may be as described for the case where the rubber composition of the present invention is applied to a sidewall.

The amount of the carbon black per 100 parts by mass of the rubber component is preferably 10 parts by mass or larger, more preferably 15 parts by mass or larger. The amount of the carbon black is preferably 100 parts by mass or smaller, more preferably 80 parts by mass or smaller, further preferably 70 parts by mass or smaller. The carbon black contained at smaller than 10 parts by mass tends to give insufficient reinforcing properties. If the amount exceeds 100 parts by mass, heat build-up is increased so that fuel economy tends to be deteriorated.

When the rubber composition of the present invention is applied to a breaker topping, the rubber composition of the present invention may contain a white filler. The white filler may be as described for the case where the rubber composition of the present invention is applied to a sidewall. Moreover, the amount of the white filler is also the same as described for the case where the rubber composition of the present invention is applied to a sidewall.

When the rubber composition of the present invention is applied to a breaker topping, the rubber composition of the present invention preferably contains an organic acid cobalt salt. The organic acid cobalt salt serves to crosslink the cords (steel cords) to the rubber. The addition of this component can therefore improve the adhesion between the cords and the rubber.

Examples of the organic acid cobalt salt include cobalt stearate, cobalt naphthenate, cobalt neodecanoate, and cobalt boron 3 neodecanoate. Among them, cobalt stearate or cobalt naphthenate is preferred.

The amount of the organic acid cobalt salt, calculated as metallic cobalt per 100 parts by mass of the rubber component is preferably 0.05 parts by mass or larger, more preferably 0.08 parts by mass or larger. If the amount is smaller than 0.05 parts by mass, the adhesion between the plated layer of the steel cords and the rubber might be insufficient. Also, the amount of the organic acid cobalt salt is preferably 0.5 parts by mass or smaller, more preferably 0.3 parts by mass or smaller, further preferably 0.2 parts by mass or smaller. If the amount exceeds 0.5 parts by mass, a significant oxidative degradation of the rubber tends to occur and thereby deteriorate breaking properties.

When the rubber composition of the present invention is applied to a breaker topping, the rubber composition of the present invention preferably contains zinc oxide. The addition of zinc oxide improves the adhesion between the plated layer of the steel cords and the rubber. The zinc oxide also serves as a vulcanization activator for the rubber. The zinc oxide is also effective for preventing scorch.

The amount of the zinc oxide per 100 parts by mass of the rubber component is preferably 2 parts by mass or larger, more preferably 5 parts by mass or larger, further preferably 6 parts by mass or larger. If the amount is smaller than 2 parts by mass, the adhesion between the plated layer of the steel cords and the rubber might be insufficient and the vulcanization of the rubber might be insufficient. Also, the amount of the zinc oxide is preferably 25 parts by mass or smaller, more preferably 20 parts by mass or smaller, further preferably 15 parts by mass or smaller. If the amount exceeds 25 parts by mass, rubber strength might be reduced.

When the rubber composition of the present invention is applied to a breaker topping, the rubber composition of the present invention preferably contains sulfur as a vulcanizing agent. Examples of the sulfur include powdered sulfur, precipitated sulfur, colloidal sulfur, insoluble sulfur, and highly dispersible sulfur.

The amount of the sulfur per 100 parts by mass of the rubber component is preferably 2 parts by mass or larger, more preferably 3 parts by mass or larger, further preferably 4 parts by mass or larger. The sulfur contained at smaller than 2 parts by mass might fail to give a sufficient crosslink density, resulting in deteriorated adhesion. Also, the amount of the sulfur is preferably 10 parts by mass or smaller, more preferably 8 parts by mass or smaller, further preferably 6 parts by mass or smaller. If the amount exceeds 10 parts by mass, heat aging resistance might be deteriorated.

When the rubber composition of the present invention is applied to a breaker topping, the rubber composition of the present invention may appropriately contain, in addition to the materials described above, various materials commonly used in the tire industry, such as silane coupling agents, plasticizers (e.g., oil), stearic acid, various antioxidants, and vulcanization accelerators.

Examples of the vulcanization accelerator include sulfenamide, thiazole, thiuram, thiourea, guanidine, dithiocarbamate, aldehyde-amine or aldehyde-ammonia, imidazoline, and xanthate vulcanization accelerators. Among them, sulfenamide vulcanization accelerators are preferred because of their excellent scorch properties.

Examples of the sulfenamide vulcanization accelerator include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ).

Examples of the antioxidant include amine-ketone, amine, phenol, imidazole, and thiourea antioxidants. These antioxidants may be used alone or in combinations of two or more thereof. Among them, amine antioxidants are preferred because of their excellent breaking properties and heat resistance.

Examples of the amine antioxidant include amine derivatives such as diphenylamine derivatives and p-phenylenediamine derivatives. Examples of diphenylamine derivatives include p-(p-toluenesulfonylamido)-diphenylamine and octylated diphenylamine. Examples of p-phenylenediamine derivatives include N-(1,3-dimethylbutyl)-N'-phenyl-p-phenylenediamine (6PPD), N-phenyl-N'-isopropyl-p-phenylenediamine (IPPD), and N,N'-di-2-naphthyl-p-phenylenediamine.

The amount of the antioxidant per 100 parts by mass of the rubber component is preferably 1 part by mass or larger, more preferably 1.3 parts by mass or larger. The antioxidant contained at smaller than 1 part by mass might be unable to improve breaking properties. Also, the amount of the antioxidant is preferably 6 parts by mass or smaller, more preferably 4 parts by mass or smaller, further preferably 2 parts by mass or smaller. The antioxidant contained at more than 6 parts by mass may bloom to the surface and reduce the rubber physical properties. Since the rubber composition of the present invention is excellent in heat aging resistance, the rubber composition containing even 2 parts by mass or smaller of the antioxidant can have adequate durability.

Examples of the oil that can be used include process oils, vegetable fats and oils, and mixtures thereof. Examples of process oils include paraffinic process oil, naphthenic process oil, and aromatic process oil.

The amount of the oil per 100 parts by mass of the rubber component is preferably 0.5 parts by mass or larger, more preferably 1 part by mass or larger. Also, the amount of the oil is preferably 10 parts by mass or smaller, more preferably 8 parts by mass or smaller, further preferably 6 parts by mass or smaller. If the amount is out of the range described above, the oil might be unable to sufficiently improve hygrothermal peeling resistance or durability.

<Ply Topping>

When the rubber composition of the present invention is applied to a ply topping, the rubber component as described above can be used. The rubber component preferably includes natural rubber and styrene-butadiene rubber (SBR).

The amount of the natural rubber based on 100% by mass of the rubber component is preferably 5% by mass or more, more preferably 10% by mass or more, further preferably 20% by mass or more, particularly preferably 50% by mass or more. If the amount is less than 5% by mass, excellent fuel economy or rubber strength might not be obtained. The upper limit of the amount of the natural rubber is not particularly limited and is preferably 90% by mass or less, more preferably 80% by mass or less.

The SBR may be as described for the case where the rubber composition of the present invention is applied to a bead apex.

The amount of the SBR based on 100% by mass of the rubber component is preferably 5% by mass or more, more preferably 10% by mass or more. If the amount is less than 5% by mass, reversion resistance might be reduced. The amount of the SBR is preferably 60% by mass or less, more preferably 50% by mass or less. If the amount exceeds 60% by mass, the amount of the natural rubber is reduced so that fuel economy might be deteriorated.

When the rubber composition of the present invention is applied to a ply topping, the chemically modified microfibrillated cellulose used may be as described above and can be used in the amount as described above.

When the rubber composition of the present invention is applied to a ply topping, the carbon black used may be as described for the case where the rubber composition of the present invention is applied to a sidewall.

The amount of the carbon black per 100 parts by mass of the rubber component is preferably 10 parts by mass or larger, more preferably 15 parts by mass or larger. The amount of the carbon black is preferably 100 parts by mass or smaller, more preferably 80 parts by mass or smaller, further preferably 70 parts by mass or smaller. The carbon black contained at smaller than 10 parts by mass tends to give insufficient reinforcing properties. If the amount exceeds 100 parts by mass, heat build-up is increased so that fuel economy tends to be deteriorated.

When the rubber composition of the present invention is applied to a ply topping, the rubber composition of the present invention may contain a white filler. The white filler may be as described for the case where the rubber composition of the present invention is applied to a sidewall. Moreover, the amount of the white filler is also the same as described for the case where the rubber composition of the present invention is applied to a sidewall.

When the rubber composition of the present invention is applied to a ply topping, the rubber composition of the present invention preferably contains zinc oxide. The addition of zinc oxide improves the adhesion between the cords and the rubber. The zinc oxide also serves as a vulcanization activator for the rubber. The zinc oxide is also effective for preventing scorch.

The amount of the zinc oxide per 100 parts by mass of the rubber component is preferably 2 parts by mass or larger, more preferably 3 parts by mass or larger, further preferably 4 parts by mass or larger. If the amount is smaller than 2 parts by mass, the adhesion between the plated layer of the steel cords and the rubber might be insufficient and the vulcanization of the rubber might be insufficient. Also, the amount of the zinc oxide is preferably 25 parts by mass or smaller, more preferably 20 parts by mass or smaller, further preferably 15 parts by mass or smaller. If the amount exceeds 25 parts by mass, rubber strength might be reduced.

When the rubber composition of the present invention is applied to a ply topping, the rubber composition of the present invention preferably contains sulfur as a vulcanizing agent. Examples of the sulfur include powdered sulfur, precipitated sulfur, colloidal sulfur, insoluble sulfur, and highly dispersible sulfur.

The amount of the sulfur per 100 parts by mass of the rubber component is preferably 2 parts by mass or larger, more preferably 3 parts by mass or larger. The sulfur contained at smaller than 2 parts by mass might fail to give a sufficient crosslink density, resulting in deteriorated adhesion. Also, the amount of the sulfur is preferably 10 parts by mass or smaller, more preferably 8 parts by mass or smaller, further preferably 6 parts by mass or smaller. If the amount exceeds 10 parts by mass, heat aging resistance might be deteriorated.

When the rubber composition of the present invention is applied to a ply topping, the rubber composition of the present invention may appropriately contain, in addition to the materials described above, various materials commonly used in the tire industry, such as silane coupling agents, plasticizers (e.g., oil), stearic acid, various antioxidants, and vulcanization accelerators.

Examples of the vulcanization accelerator include sulfenamide, thiazole, thiuram, thiourea, guanidine, dithiocarbamate, aldehyde-amine or aldehyde-ammonia, imidazoline, and xanthate vulcanization accelerators. Among them, sulfenamide vulcanization accelerators are preferred because of their excellent scorch resistance.

Examples of the sulfenamide vulcanization accelerator include N-tert-butyl-2-benzothiazolylsulfenamide (TBBS), N-cyclohexyl-2-benzothiazolylsulfenamide (CBS), and N,N'-dicyclohexyl-2-benzothiazolylsulfenamide (DZ).

Examples of the oil that can be used include process oils, vegetable fats and oils, and mixtures thereof. Examples of process oils include paraffinic process oil, naphthenic process oil, and aromatic process oil.

The amount of the oil per 100 parts by mass of the rubber component is preferably 0.5 parts by mass or larger, more preferably 1 part by mass or larger. Also, the amount of the oil is preferably 10 parts by mass or smaller, more preferably 8 parts by mass or smaller, further preferably 6 parts by mass or smaller. If the amount is out of the range described above, the oil might be unable to sufficiently improve hygrothermal peeling resistance or durability.

<Tread>

When the rubber composition of the present invention is applied to a tread, the rubber component as described above can be used. The rubber component preferably includes natural rubber and styrene-butadiene rubber (SBR).

The amount of the natural rubber based on 100% by mass of the rubber component is preferably 5% by mass or more, more preferably 10% by mass or more, further preferably 20% by mass or more. If the amount is less than 5% by mass, excellent fuel economy might not be obtained. Also, the amount of the natural rubber is preferably 80% by mass or less, more preferably 60% by mass or less, further preferably 40% by mass or less. If the amount exceeds 80% by mass, wet-grip performance might be reduced.

The SBR may be as described for the case where the rubber composition of the present invention is applied to a bead apex.

The amount of the SBR based on 100% by mass of the rubber component is preferably 40% by mass or more, more preferably 50% by mass or more. If the amount is less than 40% by mass, sufficient grip performance might not be obtained. The amount of the SBR is preferably 90% by mass or less, more preferably 80% by mass or less. If the amount exceeds 90% by mass, the amount of the natural rubber is reduced so that fuel economy might be deteriorated.

When the rubber composition of the present invention is applied to a tread, the chemically modified microfibrillated cellulose used may be as described above and can be used in the amount as described above.

When the rubber composition of the present invention is applied to a tread, the carbon black used may be as described for the case where the rubber composition of the present invention is applied to a sidewall.

The amount of the carbon black per 100 parts by mass of the rubber component is preferably 1 part by mass or larger, more preferably 2 parts by mass or larger. The amount of the carbon black is preferably 150 parts by mass or smaller, more preferably 100 parts by mass or smaller, further preferably 50 parts by mass or smaller, particularly preferably 30 parts by mass or smaller. Within the range described above, good fuel economy, abrasion resistance, and wet-grip performance are obtained.

When the rubber composition of the present invention is applied to a tread, the rubber composition of the present invention preferably contains a white filler. The white filler may be as described for the case where the rubber composition of the present invention is applied to a sidewall. Among others, silica is preferred from the standpoint of fuel economy.

Examples of the silica include, but are not limited to, dry process silica (silicic anhydride) and wet process silica (hydrous silicic acid). Wet process silica is preferred because this silica is rich in silanol groups.

The nitrogen adsorption specific surface area ($N_2SA$) of the silica is preferably 40 $m^2/g$ or larger, more preferably 50 $m^2/g$ or larger, further preferably 100 $m^2/g$ or larger, particularly preferably 150 $m^2/g$ or larger. If the $N_2SA$ is smaller than 40 $m^2/g$, breaking strength after vulcanization tends to be reduced. Also, the $N_2SA$ of the silica is preferably 500 $m^2/g$ or smaller, more preferably 300 $m^2/g$ or smaller, further preferably 200 $m^2/g$ or smaller. If the $N_2SA$ exceeds 500 $m^2/g$, low heat build-up properties or rubber processability tends to be reduced.

The amount of the white filler (particularly, silica) per 100 parts by mass of the rubber component is preferably 5 parts by mass or larger, more preferably 20 parts by mass or larger, further preferably 30 parts by mass or larger, particularly preferably 40 parts by mass or larger. If the amount is smaller than 5 parts by mass, low heat build-up properties might be insufficient. Also, the amount is preferably 200 parts by mass or smaller, more preferably 150 parts by mass or smaller, further preferably 130 parts by mass or smaller. If the amount exceeds 200 parts by mass, the filler is difficult to disperse in the rubber and rubber processability tends to be deteriorated.

When the rubber composition of the present invention is applied to a tread, the rubber composition containing silica preferably further contains a silane coupling agent. The silane coupling agent may be as described for the case where the rubber composition of the present invention is applied to a sidewall.

The amount of the silane coupling agent per 100 parts by mass of silica is preferably 0.5 parts by mass or larger, more preferably 1.5 parts by mass or larger, further preferably 2.5 parts by mass or larger. The silane coupling agent contained at smaller than 0.5 parts by mass might have difficulty in dispersing silica well. Also, the amount of the silane coupling agent is preferably 20 parts by mass or smaller, more preferably 15 parts by mass or smaller, further preferably 10 parts by mass or smaller. The silane coupling agent contained at larger than 20 parts by mass tends not to be effective for further improving the dispersion of silica and thereby to increase unnecessary cost. In addition, scorch time is shortened and processability during kneading or extrusion tends to be reduced.

When the rubber composition of the present invention is applied to a tread, in the rubber composition of the present invention, the combined amount of the white filler and the carbon black per 100 parts by mass of the rubber component is preferably 5 parts by mass or larger, more preferably 10 parts by mass or larger, further preferably 20 parts by mass or larger. The combined amount of the white filler and the carbon black is preferably 150 parts by mass or smaller, more preferably 120 parts by mass or smaller. Within the range described above, good fuel economy, abrasion resistance, and wet-grip performance are obtained.

When the rubber composition of the present invention is applied to a tread, the rubber composition of the present invention preferably contains an oil as a plasticizer. This can adjust hardness to an appropriately low level to give good processability. Examples of the oil that can be used include, but are not limited to, oils conventionally known in the art, including process oils such as paraffinic process oil, aromatic process oil, and naphthenic process oil, vegetable fats and oils, and mixtures thereof.

The amount of the oil per 100 parts by mass of the rubber component is preferably 1 part by mass or larger, more preferably 2 parts by mass or larger. Also, the amount of the oil is preferably 30 parts by mass or smaller, more preferably 20 parts by mass or smaller. Within the range described above, good processability is imparted and excellent fuel economy and excellent wet-grip performance are also obtained.

When the rubber composition of the present invention is applied to a tread, the rubber composition of the present invention may appropriately contain, in addition to the materials described above, various materials commonly used in the tire industry, such as zinc oxide, stearic acid, various antioxidants, plasticizers (wax, etc.) other than oil, vulcanizing agents (sulfur, organic peroxides, etc.), and vulcanization accelerators (sulfenamide and guanidine vulcanization accelerators, etc.).

The rubber compositions of the present invention to be applied to the above-described components may he prepared by conventional methods, such as for example by kneading the components for each of the above-described components using a rubber kneading machine such as an open roll mill or a Banbury mixer, followed by vulcanization.

The pneumatic tires including the components, except the breaker topping and the ply topping, prepared using the rubber compositions of the present invention can be produced by ordinary methods using the rubber compositions. Specifically, each unvulcanized rubber composition containing various additives as needed is extruded and processed according to the shape of the corresponding component and then formed by an ordinary method on a tire building machine and assembled with other tire components to build an unvulcanized tire, which is then heated and pressurized in a vulcanizer to produce a tire.

The pneumatic tires including the breaker topping prepared using the rubber composition of the present invention can be produced by ordinary methods using the rubber composition. Specifically, steel cords are coated with the rubber composition, formed into the shape of a breaker, and then assembled with other tire components to build an unvulcanized tire, which is then vulcanized to produce a pneumatic tire (e.g. radial tire).

The pneumatic tires including the ply topping prepared using the rubber composition of the present invention can be produced by ordinary methods using the rubber composition. Specifically, the rubber composition is kneaded by an ordinary method to prepare an unvulcanized rubber composition, which is then press-bonded to cords to form an unvulcanized ply strip (rubberized cords). Then, the ply strip is assembled with other components on a tire building machine by an ordinary method to build an unvulcanized tire, which is then heated and pressurized in a vulcanizer to produce a pneumatic tire of the present invention.

The pneumatic tires including the components prepared using the rubber compositions of the present invention can be suitably used as tires for passenger cars, tires for trucks and buses, tires for two-wheel vehicles, racing tires, or the like, and especially as tires for passenger cars.

Next, the case where the tire of the present invention is a studless winter tire will be described.

<Studless Winter Tire>

When the rubber composition of the present invention is applied to each component of a studless winter tire, the rubber component as described above can be used. The rubber component preferably includes natural rubber and polybutadiene rubber (BR) from the standpoint of imparting excellent low temperature properties.

The amount of the natural rubber based on 100% by mass of the rubber component is preferably 5% by mass or more, more preferably 30% by mass or more, further preferably 40% by mass or more, particularly preferably 50% by mass or more. If the amount is less than 5% by mass, excellent fuel economy might not be obtained. Also, the amount of the natural rubber is preferably 90% by mass or less, more preferably 80% by mass or less, further preferably 75% by mass or less. If the amount exceeds 90% by mass, performance on snow and ice or abrasion resistance might be reduced.

The BR may be as described for the BR used when the rubber composition of the present invention is applied to a sidewall.

The amount of the BR based on 100% by mass of the rubber component is preferably 10% by mass or more, more preferably 20% by mass or more, further preferably 30% by mass or more, from the standpoint of achieving necessary performance on snow and ice. Also, the amount of the BR is preferably 80% by mass or less, more preferably 70% by mass or less, further preferably 60% by mass or less, from the standpoint of processability.

When the rubber composition of the present invention is applied to each component of a studless winter tire, the chemically modified microfibrillated cellulose used may be as described above and can be used in the amount as described above.

When the rubber composition of the present invention is applied to each component of a studless winter tire, examples of the carbon black used include, but are not limited to, GPF, FEF, HAF, ISAF, and SAF. These carbon blacks may be used alone or in combinations of two or more thereof.

The nitrogen adsorption specific surface area ($N_2SA$) of the carbon black is preferably 50 $m^2/g$ or larger, more preferably 70 $m^2/g$ or larger. Also, the $N_2SA$ is preferably 200 $m^2/g$ or smaller, more preferably 180 $m^2/g$ or smaller, further preferably 150 $m^2/g$ or smaller. Carbon black having a $N_2SA$ of smaller than 50 $m^2/g$ tends to produce an insufficient reinforcing effect. Carbon black having a $N_2SA$ exceeding 200 $m^2/g$ tends to reduce fuel economy.

The amount of the carbon black per 100 parts by mass of the rubber component is preferably 1 part by mass or larger, more preferably 2 parts by mass or larger. The amount of the carbon black is preferably 150 parts by mass or smaller, more preferably 100 parts by mass or smaller, further preferably 50 parts by mass or smaller, particularly preferably 30 parts by mass or smaller. Within the range described above, good fuel economy, performance on snow and ice, and abrasion resistance are obtained.

When the rubber composition of the present invention is applied to each component of a studless winter tire, the rubber composition of the present invention preferably contains a white filler. The white filler may be as described for the case where the rubber composition of the present invention is applied to a sidewall. Among others, silica is preferred from the standpoint of fuel economy.

Examples of the silica include, but are not limited to, dry process silica (silicic anhydride) and wet process silica (hydrous silicic acid). Wet process silica is preferred because this silica is rich in silanol groups.

The nitrogen adsorption specific surface area ($N_2SA$) of the silica is preferably 40 $m^2/g$ or larger, more preferably 50 $m^2/g$ or larger, further preferably 100 $m^2/g$ or larger, particularly preferably 150 $m^2/g$ or larger. If the $N_2SA$ is smaller than 40 $m^2/g$, breaking strength after vulcanization tends to be reduced. Also, the $N_2SA$ of the silica is preferably 500 $m^2/g$ or smaller, more preferably 300 $m^2/g$ or smaller, further preferably 250 $m^2/g$ or smaller. If the $N_2SA$ exceeds 500 $m^2/g$, low heat build-up properties or rubber processability tends to be reduced.

The amount of the white filler (particularly, silica) per 100 parts by mass of the rubber component is preferably 5 parts by mass or larger, more preferably 20 parts by mass or larger, further preferably 30 parts by mass or larger, particularly preferably 40 parts by mass or larger. If the amount is smaller than 5 parts by mass, low heat build-up properties might be insufficient. Also, the amount is preferably 200 parts by mass or smaller, more preferably 150 parts by mass or smaller, further preferably 130 parts by mass or smaller. When the amount exceeds 200 parts by mass, the filler is difficult to disperse in the rubber and rubber processability tends to be deteriorated.

When the rubber composition of the present invention is applied to each component of a studless winter tire, the rubber composition containing silica preferably further contains a silane coupling agent. The silane coupling agent may be as described for the case where the rubber composition of the present invention is applied to a sidewall as mentioned above.

The amount of the silane coupling agent per 100 parts by mass of silica is preferably 0.5 parts by mass or larger, more preferably 1.5 parts by mass or larger, further preferably 2.5 parts by mass or larger. The silane coupling agent contained at smaller than 0.5 parts by mass might have difficulty in dispersing silica well. Also, the amount of the silane coupling agent is preferably 20 parts by mass or smaller, more preferably 15 parts by mass or smaller, further preferably 10 parts by mass or smaller. The silane coupling agent contained at larger than 20 parts by mass tends not to be effective for further improving the dispersion of silica and thereby to increase unnecessary cost. In addition, scorch time is shortened and processability during kneading or extrusion tends to be reduced.

When the rubber composition of the present invention is applied to each component of a studless winter tire, in the rubber composition of the present invention, the combined amount of the white filler and the carbon black per 100 parts by mass of the rubber component is preferably 5 parts by mass or larger, more preferably 10 parts by mass or larger, further preferably 20 parts by mass or larger. The combined amount of the white filler and the carbon black is preferably 150 parts by mass or smaller, more preferably 120 parts by mass or smaller. Within the range described above, good fuel economy, performance on snow and ice, and abrasion resistance are obtained.

When the rubber composition of the present invention is applied to each component of a studless winter tire, the rubber composition of the present invention preferably contains an oil as a plasticizer. This can adjust hardness to an appropriately low level to give good performance on snow and ice. Examples of the oil that can be used include, but are not limited to, oils conventionally known in the art, including process oils such as paraffinic process oil, aromatic process oil, and naphthenic process oil, vegetable fats and oils, and mixtures thereof.

The amount of the oil per 100 parts by mass of the rubber component is preferably 5 parts by mass or larger, more preferably 10 parts by mass or larger, further preferably 15 parts by mass or larger. The oil contained at smaller than 5 parts by mass is less effective for sufficiently improving performance on snow and ice. Also, the amount of the oil is preferably 100 parts by mass or smaller, more preferably 80 parts by mass or smaller, further preferably 50 parts by mass or smaller. The oil contained at larger than 100 parts by mass reduces abrasion resistance and may also reduce reversion resistance.

When the rubber composition of the present invention is applied to each component of a studless winter tire, the rubber composition of the present invention may appropriately contain, in addition to the materials described above, various materials commonly used in the tire industry, such as zinc oxide, stearic acid, various antioxidants, plasticizers (wax, etc.) other than oil, vulcanizing agents (sulfur, organic peroxides, etc.), and vulcanization accelerators (sulfenamide and guanidine vulcanization accelerators, etc.).

The rubber composition of the present invention to be applied to each component of a studless winter tire may be prepared by conventional methods, such as for example by kneading the components of the rubber composition to be applied to each component of a studless winter tire, using a rubber kneading machine such as an open roll mill or a Banbury mixer, followed by vulcanization.

The rubber compositions of the present invention can be used in various components of studless winter tires, such as cap treads, base treads, undertreads, clinch apices, bead apices, sidewalls, breakers, edge bands, full bands, breaker cushion rubbers, or carcass cord-topping rubbers, and can be particularly suitably used in treads.

The studless winter tires including the components prepared using the rubber compositions of the present invention can be produced by ordinary methods using the rubber compositions. Specifically, each unvulcanized rubber composition containing various additives as needed is extruded and processed according to the shape of the corresponding component (e.g. tread) and then formed by an ordinary method on a tire building machine and assembled with other tire components to build an unvulcanized tire, which is then heated and pressurized in a vulcanizer to produce a studless winter tire of the present invention.

The studless winter tires including the components prepared using the rubber compositions of the present invention can be suitably used for passenger cars or trucks and buses (heavy duty vehicles).

Next, the case where the tire of the present invention is a run-flat tire will be described.

When the tire of the present invention is a run-flat tire, the rubber composition of the present invention can be applied to a lining strip layer.

The lining strip layer refers to a sidewall-reinforcing layer placed inside a sidewall portion. Specific examples include a crescentic reinforcing rubber layer gradually decreasing in thickness toward both end directions and extending from a bead portion to a shoulder portion while being in contact with the inside of a carcass ply, a reinforcing rubber layer placed between the main body of a carcass ply and its folded portion and extending from a bead portion to a tread portion, and a two-layer reinforcing rubber layer placed between a plurality of carcass plies or reinforcing plies. The lining strip layer is specifically a component shown in, for example, FIG. 1 of JP 2007-326559 A or FIG. 1 of JP 2004-330822 A, all of which are included herein by reference.

<Lining Strip Layer>

When the rubber composition of the present invention is applied to a lining strip layer of a run-flat tire, the rubber component as described above can be used. The rubber component preferably includes natural rubber and polybutadiene rubber (BR) from the standpoint of durability.

The amount of the natural rubber based on 100% by mass of the rubber component is preferably 5% by mass or more, more preferably 10% by mass or more, further preferably 20% by mass or more. If the amount is less than 5% by mass, excellent fuel economy might not be obtained. Also, the amount of the natural rubber is preferably 90% by mass or less, more preferably 70% by mass or less, further preferably 50% by mass or less, particularly preferably 30% by mass or less. If the amount exceeds 90% by mass, breaking strength might be reduced.

The BR is not particularly limited, and BR generally known in the tire industry can be used. For example, polybutadiene rubber having a high cis content such as BR1220 manufactured by Zeon Corp., and BR130B and BR150B manufactured by Ube Industries, Ltd., modified polybutadiene rubber such as BR1250H manufactured by Zeon Corp., polybutadiene rubber containing syndiotactic polybutadiene crystals such as VCR412 and VCR617 manufactured by Ube Industries, Ltd., or polybutadiene rubber synthesized using a rare earth catalyst such as BUNA-CB25 manufactured by LANXESS may be used. These BRs may be used alone or in combinations of two or more thereof. In a suitable embodiment of the present invention, for example, the polybutadiene rubber having a high cis content and the polybutadiene rubber containing syndiotactic polybutadiene crystals are used in combination.

The cis content in the BR is preferably 70% by mass or more, more preferably 90% by mass or more, further preferably 97% by mass or more.

The Mooney viscosity ($ML_{1+4}$ (100° C.)) of the BR is preferably 10 or higher, more preferably 30 or higher. If the Mooney viscosity is lower than 10, the dispersibility of filler tends to be reduced. The Mooney viscosity is preferably 120 or lower, more preferably 80 or lower. If the Mooney viscosity exceeds 120, rubber scorch (discoloration) might occur during extrusion processing.

When the BR containing syndiotactic polybutadiene crystals (SPB-containing BR) is added, the SPB-containing BR may be one generally used in tire production. Preferred is SPB-containing BR in which 1,2-syndiotactic polybutadiene crystals are chemically bonded to and dispersed in the butadiene matrix, because the aforementioned properties can be achieved well.

The melting point of 1,2-syndiotactic polybutadiene crystals in the SPB-containing BR is preferably 180° C. or higher, more preferably 190° C. or higher, while it is preferably 220° C. or lower, more preferably 210° C. or lower. SPB-containing BR with a melting point of lower than 180° C. might not be effective for sufficiently improving handling stability. SPB-containing BR with a melting point of higher than 220° C. tends to deteriorate processability.

The 1,2-syndiotactic polybutadiene crystal content (amount of boiling n-hexane insolubles) in the SPB-containing BR is preferably 2.5% by mass or more, more preferably 10% by mass or more. If the content is less than 2.5% by mass, an insufficient reinforcing effect (E*) might be obtained. The 1,2-syndiotactic polybutadiene crystal content is preferably 20% by mass or less, more preferably 18% by mass or less. If the content exceeds 20% by mass, processability tends to be deteriorated.

The amount of the BR (if two or more types of BRs are contained, the combined amount of these BRs) based on 100% by mass of the rubber component is preferably 30% by mass or more, more preferably 40% by mass or more, further preferably 50% by mass or more, particularly preferably 70% by mass or more. Also, the amount is preferably 90% by mass or less, more preferably 80% by mass or less. If the amount is less than 30% by mass, sufficient breaking strength or run-flat durability might not be obtained. If the amount exceeds 90% by mass, fuel economy or processability might be reduced.

When the rubber composition of the present invention is applied to a lining strip layer of a run-flat tire, the chemically modified microfibrillated cellulose used may be as described above and can be used in the amount as described above.

When the rubber composition of the present invention is applied to a lining strip layer of a run-flat tire, the carbon black used may be as described for the case where the rubber composition of the present invention is applied to a sidewall. The amount of the carbon black per 100 parts by mass of the rubber component is preferably 5 parts by mass or larger, more preferably 10 parts by mass or larger. The amount of the carbon black is preferably 150 parts by mass or smaller, more preferably 100 parts by mass or smaller, further preferably 80 parts by mass or smaller. If the amount is smaller than 5 parts by mass, a sufficient reinforcing effect might not be obtained. If the amount exceeds 150 parts by mass, dispersibility or processability tends to be deteriorated.

When the rubber composition of the present invention is applied to a lining strip layer of a run-flat tire, the rubber composition of the present invention may contain a white filler. The white filler may be as described for the case where the rubber composition of the present invention is applied to a sidewall as described above. Moreover, the amount of the white filler is also the same as described for the case where the rubber composition of the present invention is applied to a sidewall.

When the rubber composition of the present invention is applied to a lining strip layer of a run-flat tire, the rubber composition of the present invention preferably contains an oil as a plasticizer. This can adjust hardness to an appropriately low level to give good processability. Examples of the oil that can be used include, but are not limited to, oils conventionally known in the art, including process oils such as paraffinic process oil, aromatic process oil, and naphthenic process oil, vegetable fats and oils, and mixtures thereof.

When the rubber composition of the present invention is applied to a lining strip layer of a run-flat tire, the rubber composition of the present invention may appropriately contain, in addition to the materials described above, various materials commonly used in the tire industry, such as silane coupling agents, zinc oxide, stearic acid, various antioxidants, plasticizers (wax, etc.) other than oil, vulcanizing agents (sulfur, organic peroxides, etc.), and vulcanization accelerators (sulfenamide and guanidine vulcanization accelerators, etc.).

The rubber composition of the present invention to be applied to a lining strip layer of a run-flat tire may be prepared by conventional methods, such as for example by kneading the components of the rubber composition to be applied to a lining strip layer of a run-flat tire, using a rubber kneading machine such as an open roll mill or a Banbury mixer, followed by vulcanization.

The run-flat tires including the lining strip layer prepared using the rubber composition of the present invention can be produced by ordinary methods using the rubber composition. Specifically, the unvulcanized rubber composition containing various additives as needed is extruded and processed according to the shape of a lining strip layer and then formed by an ordinary method on a tire building machine and assembled with other tire components to build an unvulcanized tire, which is then heated and pressurized in a vulcanizer to produce a run-flat tire of the present invention.

The run-flat tires including the lining strip layer prepared using the rubber composition of the present invention can be suitably used as tires for passenger cars, tires for trucks and buses, tires for two-wheel vehicles, racing tires, or the like, and especially as tires for passenger cars.

EXAMPLES

The present invention will be specifically described with reference to Examples. However, the present invention is not intended to be limited to these examples.

The various chemical agents used in Preparation Examples will be listed below.

Microfibrillated cellulose: biomass nanofiber manufactured by Sugino Machine Ltd. (product name "BiNFi-s Cellulose", solid content: 2% by mass, water content: 98% by mass, average fiber diameter: 20 to 50 nm, average fiber length: 500 to 1000 nm)

N-Methylpyrrolidone (manufactured by Tokyo Chemical Industry Co., Ltd.)

Pyridine (manufactured by Tokyo Chemical Industry Co., Ltd.)

Oleoyl chloride (manufactured by Tokyo Chemical Industry Co., Ltd.)

Myristoyl chloride (manufactured by Tokyo Chemical Industry Co., Ltd.)

[Preparation of Chemically Modified Microfibrillated Cellulose]

Preparation Example 1

The water in the microfibrillated cellulose was replaced with N-methylpyrrolidone to prepare a microfibrillated cellulose preparation having a solid concentration of 1% by weight.

To the obtained microfibrillated cellulose preparation, pyridine was added at 1.5 mol per mole of glucose unit of the microfibrillated cellulose, then oleoyl chloride was added at 1 mol per mole of glucose unit of the microfibrillated cellulose, and the mixture was reacted at 30° C.

After completion of the reaction, the resulting product was thoroughly washed with ethanol and dried to obtain a chemically modified microfibrillated cellulose.

The degree of substitution of the obtained chemically modified microfibrillated cellulose was determined by FT-IR analysis from the ratio of peak intensity between the substituents modified with oleoyl chloride and the hydroxy groups and was found to be 0.4.

The FT-IR analysis was conducted by ATR (attenuated total reflectance) using Spectrum 100 manufactured by PerkinElmer, Inc.

[Preparation of Comparative Chemically Modified Microfibrillated Cellulose]

Preparation Example 2

A comparative chemically modified microfibrillated cellulose was prepared in the same way as in Preparation Example 1, except that myristoyl chloride was used instead of oleoyl chloride.

The degree of substitution of the obtained comparative chemically modified microfibrillated cellulose was determined by FT-IR analysis from the ratio of peak intensity between the substituents modified with myristoyl chloride and the hydroxy groups and was found to be 0.4.

The FT-IR analysis was conducted in the same way as above.

[Dispersibility of Chemically Modified Microfibrillated Cellulose]

The various chemical agents used in Example and Comparative Examples will be described below.

Natural rubber: TSR20
Polybutadiene rubber: BR150B manufactured by Ube Industries, Ltd. (cis content: 97% by mass, $ML_{1+4}$ (100° C.): 40)
Chemically modified microfibrillated cellulose: chemically modified microfibrillated cellulose prepared in Preparation Example 1
Comparative chemically modified microfibrillated cellulose: comparative chemically modified microfibrillated cellulose prepared in Preparation Example 2
Carbon black: Shoblack N550 manufactured by Cabot Japan K.K. ($N_2SA$: 42 $m^2/g$)
Antioxidant: Nocrac 6C manufactured by Ouchi Shinko Chemical Industrial Co., Ltd. (N-phenyl-N'-(1,3-dimethylbutyl)-p-phenylenediamine) (6PPD)
Oil: Diana Process AH-24 manufactured by Idemitsu Kosan Co., Ltd.
Zinc oxide: zinc oxide #2 manufactured by Mitsui Mining & Smelting Co., Ltd.
Stearic acid: Stearic Acid Camellia, beads, manufactured by NOF Corp.
Sulfur: Seimi Sulfur manufactured by Nippon Kanryu Industry Co., Ltd. (oil content: 10%)
Vulcanization accelerator: Nocceler NS manufactured by Ouchi Shinko Chemical Industrial Co., Ltd. (N-t-butyl-2-benzothiazole sulfenamide [TBBS])

Example 1-1 and Comparative Examples 1-1 to 1-3

According to the recipes shown in Table 1, the materials other than the sulfur and the vulcanization accelerator were kneaded using a 1.7 L Banbury mixer manufactured by Kobe Steel, Ltd. to obtain a kneaded mixture. Next, the sulfur and the vulcanization accelerator were added to the kneaded mixture and kneaded thereinto using an open roll mill to obtain an unvulcanized rubber composition. The obtained unvulcanized rubber composition was press-vulcanized to obtain a vulcanized rubber composition.

The thus obtained vulcanized rubber compositions were evaluated as described below. The results are shown in Table 1.

<Dispersibility of Chemically Modified Microfibrillated Cellulose; Dispersion of Fibers>

The cross sections of test specimens prepared from the vulcanized rubber compositions of Example and Comparative Examples were observed under an optical microscope (magnification: ×500) and evaluated for dispersibility according to the following criteria:
Very good: No aggregate was found.
Good: Fine aggregates were found.
Fair: Aggregates that were not fine were found.
Poor: Large aggregates were found.

TABLE 1

| | | Ex. 1-1 | Com. Ex. 1-1 | Com. Ex. 1-2 | Com. Ex. 1-3 |
|---|---|---|---|---|---|
| Formulation (parts by mass) | Natural rubber | 45 | 45 | 45 | 45 |
| | Polybutadiene rubber | 55 | 55 | 55 | 55 |
| | Chemically modified microfibrillated cellulose | 2 | 2 | — | — |
| | Comparative chemically modified microfibrillated cellulose | — | — | 2 | 2 |
| | Carbon black | 53 | — | 53 | — |
| | Antioxidant | 3 | 3 | 3 | 3 |
| | Oil | 7 | 7 | 7 | 7 |
| | Zinc oxide | 3 | 3 | 3 | 3 |
| | Stearic acid | 2.5 | 2.5 | 2.5 | 2.5 |
| | Sulfur | 1.5 | 1.5 | 1.5 | 1.5 |
| | Vulcanization accelerator | 0.7 | 0.7 | 0.7 | 0.7 |
| Evaluation | Dispersibility of chemically modified microfibrillated cellulose | Very good | Fair | Good | Fair |

The results of Table 1 demonstrated that: the combined use of carbon black and a chemically modified microfibrillated cellulose according to the present invention can improve the dispersibility of the chemically modified microfibrillated cellulose in the rubber composition; and this effect is significant compared to the dispersibility-improving effect of the combined use of carbon black and a chemically modified microfibrillated cellulose that is out of the scope of the present invention.

In the evaluation of the dispersibility of the chemically modified microfibrillated cellulose, the rubber composition used was formulated for a sidewall as mentioned later. Even when this evaluation was conducted using the rubber compositions formulated for other components as mentioned later, similar tendencies to the results of Table 1 were obtained.

Examples and comparative examples will be given below for each component or the like.
<Sidewall>
The various chemical agents used in Examples and Comparative Examples will be described below.
Natural rubber: TSR20
Polybutadiene rubber: BR150B manufactured by Ube Industries, Ltd. (cis content: 97% by mass, $ML_{1+4}$ (100° C.): 40)
Chemically modified microfibrillated cellulose: chemically modified microfibrillated cellulose prepared in Preparation Example 1
Comparative chemically modified microfibrillated cellulose: comparative chemically modified microfibrillated cellulose prepared in Preparation Example 2
Carbon black: Shoblack N550 manufactured by Cabot Japan K.K. ($N_2SA$: 42 m$^2$/g)
Antioxidant: Nocrac 6C manufactured by Ouchi Shinko Chemical Industrial Co., Ltd. (N-phenyl-N'-(1,3-dimethylbutyl)-p-phenylenediamine) (6PPD)
Oil: Diana Process AH-24 manufactured by Idemitsu Kosan Co., Ltd.
Zinc oxide: zinc oxide #2 manufactured by Mitsui Mining & Smelting Co., Ltd.
Stearic acid: Stearic Acid Camellia, beads, manufactured by NOF Corp.
Sulfur: Seimi Sulfur manufactured by Nippon Kanryu Industry Co., Ltd. (oil content: 10%)
Vulcanization accelerator: Nocceler NS manufactured by Ouchi Shinko Chemical Industrial Co., Ltd. (N-t-butyl-2-benzothiazole sulfenamide [TBBS])

Examples 2-1 and 2-2 and Comparative Examples 2-1 to 2-3

Unvulcanized rubber compositions and vulcanized rubber compositions were prepared following the procedures of Example 1-1, except for using the recipes shown in Table 2.

Moreover, the unvulcanized rubber composition was formed into the shape of a sidewall and assembled with other tire components on a tire building machine to build an unvulcanized tire, which was then vulcanized to produce a tire for testing (size: 195/65R15).

The thus obtained vulcanized rubber compositions and tires for testing were evaluated as described below. The results are shown in Table 2.
(Viscoelasticity Test)

The dynamic elastic modulus (E* [MPa]) and loss tangent (tan δ) of the vulcanized rubber composition were measured under conditions involving a temperature of 70° C., a frequency of 10 Hz, an initial strain of 10%, and a dynamic strain of 2% using a viscoelasticity spectrometer VES (manufactured by IWAMOTO SEISAKUSHO) and expressed as indices (E* index and tan δ index), with Comparative Example 2-1 equal to 100. A higher E* index means a better dynamic elastic modulus, and a higher tan δ index means lower heat build-up and better low heat build-up properties (fuel economy).
(Tensile Test)

According to JIS K6251 "Rubber, vulcanized or thermoplastic—Determination of tensile stress-strain properties", a tensile test was conducted using a No. 3 dumbbell-shaped test specimen prepared from the vulcanized rubber composition to measure the elongation at break (tensile elongation; EB [%]) and tensile strength at break (tensile breaking strength; TB [MPa]) of the vulcanized rubber composition. From the obtained values, the breaking strength was determined according to the following expression and expressed as an index (breaking strength index), with Comparative Example 2-1 equal to 100.

Breaking strength=$EB \times TB$

A higher breaking strength index means better breaking strength.
(Flex Crack Growth Resistance Test)

According to JIS K6260 "Testing method of flex cracking and crack growth for rubber, vulcanized or thermoplastic (De Mattia)", a sample was prepared using the vulcanized rubber sheet (vulcanized rubber composition) and subjected to a flex crack growth test in which the rubber sheet was repeatedly flexed at 70% elongation one million times, followed by the measurement of the length of a generated crack. The reciprocal of the measured value (length) was expressed as an index, with Comparative Example 2-1 equal to 100. A higher index means that the growth of cracks was more suppressed, indicating better flex crack growth resistance.
(Test on Tension Set Under Constant Elongation)

According to JIS K6273, a test specimen was prepared from the obtained vulcanized rubber composition and elongated to the prescribed elongation in an atmosphere of 25° C. Then, the test specimen was freely contracted and residual elongation was measured to determine the tension set under constant elongation. The reciprocal of the tension set value was expressed as an index, with Comparative Example 2-1 equal to 100. A higher index means a lower tension set and better tension set resistance (rubberiness).

TABLE 2

|  |  | Com. Ex. 2-1 | Ex. 2-1 | Ex. 2-2 | Com. Ex. 2-2 | Com. Ex. 2-3 |
|---|---|---|---|---|---|---|
| Formulation (parts by mass) | Natural rubber | 45 | 45 | 45 | 45 | 45 |
|  | Polybutadiene rubber | 55 | 55 | 55 | 55 | 55 |
|  | Chemically modified microfibrillated cellulose | — | 2 | 4 | — | — |
|  | Comparative chemically modified microfibrillated cellulose | — | — | — | 2 | 4 |
|  | Carbon black | 53 | 53 | 53 | 53 | 53 |
|  | Antioxidant | 3 | 3 | 3 | 3 | 3 |

TABLE 2-continued

|  |  | Com. Ex. 2-1 | Ex. 2-1 | Ex. 2-2 | Com. Ex. 2-2 | Com. Ex. 2-3 |
|---|---|---|---|---|---|---|
|  | Oil | 7 | 7 | 7 | 7 | 7 |
|  | Zinc oxide | 3 | 3 | 3 | 3 | 3 |
|  | Stearic acid | 2.5 | 2.5 | 2.5 | 2.5 | 2.5 |
|  | Sulfur | 1.5 | 1.5 | 1.5 | 1.5 | 1.5 |
|  | Vulcanization accelerator | 0.7 | 0.7 | 0.7 | 0.7 | 0.7 |
| Evaluation | Elastic modulus E* | 100 | 155 | 190 | 150 | 175 |
|  | Breaking strength | 100 | 110 | 105 | 85 | 85 |
|  | Fuel economy | 100 | 110 | 100 | 90 | 80 |
|  | Flex crack growth resistance | 100 | 110 | 100 | 60 | 50 |
|  | Tension set resistance (rubberiness) | 100 | 100 | 98 | 80 | 65 |

As seen in Table 2, in Examples 2-1 and 2-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, improved elastic modulus was exhibited and better or equivalent results were obtained about breaking strength, fuel economy, and flex crack growth resistance. In contrast, in Comparative Examples 2-2 and 2-3 using a comparative chemically modified microfibrillated cellulose not binding to rubber, deteriorated results were obtained about breaking strength, fuel economy, and flex crack growth resistance though improved elastic modulus was exhibited.

<Base Tread>

The various chemical agents used in Examples and Comparative Examples will be described below.

Natural rubber: TSR20
Polybutadiene rubber: BR150B manufactured by Ube Industries, Ltd. (cis content: 97% by mass, $ML_{1+4}$ (100° C.): 40)
Chemically modified microfibrillated cellulose: chemically modified microfibrillated cellulose prepared in Preparation Example 1
Comparative chemically modified microfibrillated cellulose: comparative chemically modified microfibrillated cellulose prepared in Preparation Example 2
Carbon black: Shoblack N550 manufactured by Cabot Japan K.K. (N2SA: 42 m$^2$/g)
Antioxidant: Nocrac 6C manufactured by Ouchi Shinko Chemical Industrial Co., Ltd. (N-phenyl-N'-(1,3-dimethylbutyl)-p-phenylenediamine) (6PPD)
Oil: Diana Process AH-24 manufactured by Idemitsu Kosan Co., Ltd.
Zinc oxide: zinc oxide #2 manufactured by Mitsui Mining & Smelting Co., Ltd.
Stearic acid: Stearic Acid Camellia, beads, manufactured by NOF Corp.
Sulfur: Seimi Sulfur manufactured by Nippon Kanryu Industry Co., Ltd. (oil content: 10%)
Vulcanization accelerator: Nocceler NS manufactured by Ouchi Shinko Chemical Industrial Co., Ltd. (N-t-butyl-2-benzothiazole sulfenamide [TBBS])

Examples 3-1 and 3-2 and Comparative Examples 3-1 to 3-3

Unvulcanized rubber compositions and vulcanized rubber compositions were prepared following the procedures of Example 1-1, except for using the recipes shown in Table 3.

Moreover, the unvulcanized rubber composition was formed into the shape of a base tread and assembled with other tire components on a tire building machine to build an unvulcanized tire, which was then vulcanized to produce a tire for testing (size: 195/65R15).

The thus obtained vulcanized rubber compositions and tires for testing were evaluated as described below. The results are shown in Table 3.

(Viscoelasticity Test)

A viscoelasticity test was carried out following the procedure of Example 2-1, except that the results were expressed as indices (E* index and tan δ index), with Comparative Example 3-1 equal to 100.

(Tensile Test)

A tensile test was carried out following the procedure of Example 2-1, except that the result was expressed as an index (breaking strength index), with Comparative Example 3-1 equal to 100.

(Handling Stability)

The tires for testing were mounted on all wheels of a vehicle (domestic front-engine, front-wheel-drive vehicle, 2000 cc), which was then driven on a test track and subjectively evaluated for handling stability by the driver. In the evaluation, each example was relatively evaluated for handling stability on a 10-point scale, where 10 was the best and Comparative Example 3-1 was given a score of 6.0. A higher score means better handling stability.

TABLE 3

|  |  | Com. Ex. 3-1 | Ex. 3-1 | Ex. 3-2 | Com. Ex. 3-2 | Com. Ex. 3-3 |
|---|---|---|---|---|---|---|
| Formulation (parts by mass) | Natural rubber | 70 | 70 | 70 | 70 | 70 |
|  | Polybutadiene rubber | 30 | 30 | 30 | 30 | 30 |
|  | Chemically modified microfibrillated cellulose | — | 2 | 4 | — | — |
|  | Comparative chemically modified microfibrillated cellulose | — | — | — | 2 | 4 |
|  | Carbon black | 40 | 40 | 40 | 40 | 40 |
|  | Antioxidant | 2 | 2 | 2 | 2 | 2 |
|  | Oil | 5 | 5 | 5 | 5 | 5 |
|  | Zinc oxide | 2 | 2 | 2 | 2 | 2 |
|  | Stearic acid | 2 | 2 | 2 | 2 | 2 |

TABLE 3-continued

|  |  | Com. Ex. 3-1 | Ex. 3-1 | Ex. 3-2 | Com. Ex. 3-2 | Com. Ex. 3-3 |
|---|---|---|---|---|---|---|
|  | Sulfur | 2 | 2 | 2 | 2 | 2 |
|  | Vulcanization accelerator | 1 | 1 | 1 | 1 | 1 |
| Evaluation | Elastic modulus E* | 100 | 155 | 190 | 150 | 175 |
|  | Breaking strength | 100 | 110 | 105 | 85 | 85 |
|  | Fuel economy | 100 | 110 | 100 | 90 | 80 |
|  | Handling stability | 6.0 | 7.0 | 6.5 | 6.0 | 5.8 |

As seen in Table 3, in Examples 3-1 and 3-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, improved elastic modulus was exhibited and better or equivalent results were obtained about breaking strength, fuel economy, and handling stability. In contrast, in Comparative Examples 3-2 and 3-3 using a comparative chemically modified microfibrillated cellulose not binding to rubber, deteriorated results were obtained about breaking strength and fuel economy though improved elastic modulus was exhibited.

<Bead Apex>

The various chemical agents used in Examples and Comparative Examples will be described below.

Natural rubber: TSR20
Styrene-butadiene rubber: Nipol 1502 manufactured by Zeon Corp. (E-SBR, styrene content: 23.5% by mass, $ML_{1+4}$ (100° C.) 52)
Chemically modified microfibrillated cellulose: chemically modified microfibrillated cellulose prepared in Preparation Example 1
Comparative chemically modified microfibrillated cellulose: comparative chemically modified microfibrillated cellulose prepared in Preparation Example 2
Carbon black: Seast N manufactured by Tokai Carbon Co., Ltd. (N330, $N_2SA$: 74 $m^2/g$, DBP oil absorption: 102 ml/100 g)
Antioxidant: Nocrac 6C manufactured by Ouchi Shinko Chemical Industrial Co., Ltd. (N-phenyl-N'-(1,3-dimethylbutyl)-p-phenylenediamine) (6PPD)
Oil: Diana Process AH-24 manufactured by Idemitsu Kosan Co., Ltd.
Resin: PR12686 manufactured by Sumitomo Bakelite Co., Ltd. (cashew oil-modified phenol resin)
Zinc oxide: zinc oxide #2 manufactured by Mitsui Mining & Smelting Co., Ltd.
Stearic acid: Stearic Acid Camellia, beads, manufactured by NOF Corp.
Sulfur: Seimi Sulfur manufactured by Nippon Kanryu Industry Co., Ltd. (oil content: 10%)
Vulcanization accelerator: Nocceler NS manufactured by Ouchi Shinko Chemical Industrial Co., Ltd. (N-t-butyl-2-benzothiazole sulfenamide [TBBS])

Examples 4-1 and 4-2 and Comparative Examples 4-1 to 4-3

Unvulcanized rubber compositions and vulcanized rubber compositions were prepared following the procedures of Example 1-1, except for using the recipes shown in Table 4.

Moreover, the unvulcanized rubber composition was formed into the shape of a bead apex and assembled with other tire components on a tire building machine to build an unvulcanized tire, which was then vulcanized to produce a tire for testing (size: 195/65R15).

The thus obtained unvulcanized rubber compositions, vulcanized rubber compositions and tires for testing were evaluated as described below. The results are shown in Table 4.

(Viscoelasticity Test)

A viscoelasticity test was carried out following the procedure of Example 2-1, except that the results were expressed as indices (E* index and tan δ index), with Comparative Example 4-1 equal to 100.

(Tensile Test)

A tensile test was carried out following the procedure of Example 2-1, except that the result was expressed as an index (breaking strength index), with Comparative Example 4-1 equal to 100.

(Processability: Measurement of Mooney Viscosity)

The Mooney viscosity of the obtained unvulcanized rubber composition was determined at 130° C. by a measurement method according to JIS K6300. The Mooney viscosity ($ML_{1+4}$) was expressed as an index (Mooney viscosity index), with Comparative Example 4-1 equal to 100. A higher index means a higher Mooney viscosity and better processability.

TABLE 4

|  |  | Com. Ex. 4-1 | Ex. 4-1 | Ex. 4-2 | Com. Ex. 4-2 | Com. Ex. 4-3 |
|---|---|---|---|---|---|---|
| Formulation (parts by mass) | Natural rubber | 80 | 80 | 80 | 80 | 80 |
|  | Styrene-butadiene rubber | 20 | 20 | 20 | 20 | 20 |
|  | Chemically modified microfibrillated cellulose | — | 2 | 4 | — | — |
|  | Comparative chemically modified microfibrillated cellulose | — | — | — | 2 | 4 |
|  | Carbon black | 60 | 60 | 60 | 60 | 60 |
|  | Antioxidant | 2 | 2 | 2 | 2 | 2 |
|  | Oil | 2 | 2 | 2 | 2 | 2 |
|  | Resin | 10 | 10 | 10 | 10 | 10 |

TABLE 4-continued

|  |  | Com. Ex. 4-1 | Ex. 4-1 | Ex. 4-2 | Com. Ex. 4-2 | Com. Ex. 4-3 |
|---|---|---|---|---|---|---|
|  | Zinc oxide | 4 | 4 | 4 | 4 | 4 |
|  | Stearic acid | 2 | 2 | 2 | 2 | 2 |
|  | Sulfur | 1 | 1 | 1 | 1 | 1 |
|  | Vulcanization accelerator | 1 | 1 | 1 | 1 | 1 |
| Evaluation | Elastic modulus E* | 100 | 120 | 150 | 115 | 125 |
|  | Breaking strength | 100 | 110 | 105 | 90 | 85 |
|  | Fuel economy | 100 | 110 | 105 | 93 | 85 |
|  | Processability | 100 | 110 | 100 | 95 | 93 |

As seen in Table 4, in Examples 4-1 and 4-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, improved elastic modulus was exhibited and better or equivalent results were obtained about breaking strength, fuel economy, and processability. In contrast, in Comparative Examples 4-2 and 4-3 using a comparative chemically modified microfibrillated cellulose not binding to rubber, deteriorated results were obtained about breaking strength and fuel economy though improved elastic modulus was exhibited.

<Clinch Apex>

The various chemical agents used in Examples and Comparative Examples will be described below.

Natural rubber: TSR20

Polybutadiene rubber: BR150B manufactured by Ube Industries, Ltd. (cis content: 97% by mass, $ML_{1+4}$ (100° C.): 40)

Chemically modified microfibrillated cellulose: chemically modified microfibrillated cellulose prepared in Preparation Example 1

Comparative chemically modified microfibrillated cellulose: comparative chemically modified microfibrillated cellulose prepared in Preparation Example 2

Carbon black: Seast N manufactured by Tokai Carbon Co., Ltd. (N330, $N_2SA$: 74 $m^2/g$, DBP oil absorption: 102 ml/100 g)

Antioxidant: Nocrac 6C manufactured by Ouchi Shinko Chemical Industrial Co., Ltd. (N-phenyl-N'-(1,3-dimethylbutyl)-p-phenylenediamine) (6PPD)

Oil: Diana Process AH-24 manufactured by Idemitsu Kosan Co., Ltd.

Zinc oxide: zinc oxide #2 manufactured by Mitsui Mining & Smelting Co., Ltd.

Stearic acid: Stearic Acid Camellia, beads, manufactured by NOF Corp.

Sulfur: Seimi Sulfur manufactured by Nippon Kanryu Industry Co., Ltd. (oil content: 10%)

Vulcanization accelerator: Nocceler NS manufactured by Ouchi Shinko Chemical Industrial Co., Ltd. (N-t-butyl-2-benzothiazole sulfenamide [TBBS])

Examples 5-1 and 5-2 and Comparative Examples 5-1 to 5-3

Unvulcanized rubber compositions and vulcanized rubber compositions were prepared following the procedures of Example 1-1, except for using the recipes shown in Table 5.

Moreover, the unvulcanized rubber composition was formed into the shape of a clinch apex and assembled with other tire components on a tire building machine to build an unvulcanized tire, which was then vulcanized to produce a tire for testing (size: 195/65R15).

The thus obtained unvulcanized rubber compositions, vulcanized rubber compositions and tires for testing were evaluated as described below. The results are shown in Table 5.

(Viscoelasticity Test)

A viscoelasticity test was carried out following the procedure of Example 2-1, except that the results were expressed as indices (E* index and tan δ index), with Comparative Example 5-1 equal to 100.

(Tensile Test)

A tensile test was carried out following the procedure of Example 2-1, except that the result was expressed as an index (breaking strength index), with Comparative Example 5-1 equal to 100.

(Handling Stability)

The tires for testing were mounted on all wheels of a vehicle (domestic front-engine, front-wheel-drive vehicle, 2000 cc), which was then driven on a test track and subjectively evaluated for handling stability by the driver. In the evaluation, each example was relatively evaluated for handling stability on a 10-point scale, where 10 was the best and Comparative Example 5-1 was given a score of 6.0. The scores were expressed as an index (handling stability index), with Comparative Example 5-1 equal to 100. A higher index means better handling stability.

(Abrasion Resistance: Rim Slippage Resistance)

The tire for testing was run on a drum for 400 hours at a speed of 20 km/h under a load of 230% of the maximum load (maximum internal pressure conditions) of the JIS standard. Then, the abrasion depth at the rim flange contact portion was measured and expressed as an index (abrasion resistance index), with Comparative Example 5-1 equal to 100. A higher index means a smaller chance of rim slippage, indicating better abrasion resistance.

(Processability: Measurement of Mooney Viscosity)

Evaluation of processability was carried out following the procedure of Example 4-1, except that the result was expressed as an index (Mooney viscosity index), with Comparative Example 5-1 equal to 100.

TABLE 5

|  |  | Com. Ex. 5-1 | Ex. 5-1 | Ex. 5-2 | Com. Ex. 5-2 | Com. Ex. 5-3 |
|---|---|---|---|---|---|---|
| Formulation (parts by mass) | Natural rubber | 50 | 50 | 50 | 50 | 50 |
|  | Polybutadiene rubber | 50 | 50 | 50 | 50 | 50 |
|  | Chemically modified microfibrillated cellulose | — | 2 | 4 | — | — |
|  | Comparative chemically modified microfibrillated cellulose | — | — | — | 2 | 4 |
|  | Carbon black | 60 | 60 | 60 | 60 | 60 |
|  | Antioxidant | 1 | 1 | 1 | 1 | 1 |
|  | Oil | 8 | 8 | 8 | 8 | 8 |
|  | Zinc oxide | 4 | 4 | 4 | 4 | 4 |
|  | Stearic acid | 1 | 1 | 1 | 1 | 1 |
|  | Sulfur | 1.5 | 1.5 | 1.5 | 1.5 | 1.5 |
|  | Vulcanization accelerator | 1.5 | 1.5 | 1.5 | 1.5 | 1.5 |
| Evaluation | Elastic modulus E* | 100 | 135 | 160 | 125 | 135 |
|  | Breaking strength | 100 | 110 | 105 | 85 | 85 |
|  | Fuel economy | 100 | 110 | 100 | 90 | 80 |
|  | Handling stability | 100 | 100 | 98 | 95 | 85 |
|  | Abrasion resistance: Rim slippage resistance | 100 | 110 | 108 | 98 | 95 |
|  | Processability | 100 | 100 | 100 | 95 | 95 |

As seen in Table 5, in Examples 5-1 and 5-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, improved elastic modulus was exhibited and better or equivalent results were obtained about breaking strength, fuel economy, abrasion resistance, and processability. In contrast, in Comparative Examples 5-2 and 5-3 using a comparative chemically modified microfibrillated cellulose not binding to rubber, deteriorated results were obtained about breaking strength and fuel economy though improved elastic modulus was exhibited.

<Innerliner>

The various chemical agents used in Examples and Comparative Examples will be described below.

Natural rubber: TSR20

Butyl-based rubber: Exxon Chlorobutyl 1066 manufactured by Exxon Mobil Corp. (chlorinated butyl rubber)

Chemically modified microfibrillated cellulose: chemically modified microfibrillated cellulose prepared in Preparation Example 1

Comparative chemically modified microfibrillated cellulose: comparative chemically modified microfibrillated cellulose prepared in Preparation Example 2

Carbon black: Seast V manufactured by Tokai Carbon Co., Ltd. (N660, $N_2SA$: 27 $m^2/g$)

Antioxidant: Nocrac 6C manufactured by Ouchi Shinko Chemical Industrial Co., Ltd. (N-phenyl-N'-(1,3-dimethylbutyl)-p-phenylenediamine) (6PPD)

Zinc oxide: zinc oxide #2 manufactured by Mitsui Mining & Smelting Co., Ltd.

Stearic acid: Stearic Acid Camellia, beads, manufactured by NOF Corp.

Sulfur: Seimi Sulfur manufactured by Nippon Kanryu Industry Co., Ltd. (oil content: 10%)

Vulcanization accelerator: Nocceler NS manufactured by Ouchi Shinko Chemical Industrial Co., Ltd. (N-t-butyl-2-benzothiazole sulfenamide [TBBS])

Examples 6-1 and 6-2 and Comparative Examples 6-1 to 6-3

Unvulcanized rubber compositions and vulcanized rubber compositions were prepared following the procedures of Example 1-1, except for using the recipes shown in Table 6.

Moreover, the unvulcanized rubber composition was formed into the shape of an innerliner and assembled with other tire components on a tire building machine to build an unvulcanized tire, which was then vulcanized to produce a tire for testing (size: 195/65R15).

The thus obtained unvulcanized rubber compositions, vulcanized rubber compositions and tires for testing were evaluated as described below. The results are shown in Table 6.

(Air Permeation Resistance)

A rubber test specimen (diameter 90 mm, thickness 1 mm) was prepared from the obtained vulcanized rubber composition. According to ASTM D-1434-75M, the air permeation coefficient (cc·cm/cm$^2$·sec/cmHg) of each example was calculated and expressed as an index (air permeation resistance index) according to the expression given below, where the air permeation coefficient of Comparative Example 6-1 was taken as a reference (=100). A higher index means lower permeability to air and better air permeation resistance.

(Air permeation resistance index)=(Air permeation coefficient of Comparative Example 6-1)/(Air permeation coefficient of each example)×100

(Viscoelasticity Test)

A viscoelasticity test was carried out following the procedure of Example 2-1, except that the result was expressed as an index (tan δ index), with Comparative Example 6-1 equal to 100.

(Processability: Measurement of Mooney Viscosity)

Evaluation of processability was carried out following the procedure of Example 4-1, except that the result was expressed as an index (Mooney viscosity index), with Comparative Example 6-1 equal to 100.

TABLE 6

|  |  | Com. Ex. 6-1 | Ex. 6-1 | Ex. 6-2 | Com. Ex. 6-2 | Com. Ex. 6-3 |
|---|---|---|---|---|---|---|
| Formulation (parts by mass) | Natural rubber | 20 | 20 | 20 | 20 | 20 |
|  | Butyl-based rubber | 80 | 80 | 80 | 80 | 80 |
|  | Chemically modified microfibrillated cellulose | — | 2 | 4 | — | — |
|  | Comparative chemically modified microfibrillated cellulose | — | — | — | 2 | 4 |
|  | Carbon black | 50 | 50 | 50 | 50 | 50 |
|  | Antioxidant | 1 | 1 | 1 | 1 | 1 |
|  | Zinc oxide | 4 | 4 | 4 | 4 | 4 |
|  | Stearic acid | 2 | 2 | 2 | 2 | 2 |
|  | Sulfur | 1 | 1 | 1 | 1 | 1 |
|  | Vulcanization accelerator | 1 | 1 | 1 | 1 | 1 |
| Evaluation | Air permeation resistance | 100 | 120 | 130 | 110 | 115 |
|  | Fuel economy | 100 | 110 | 100 | 90 | 80 |
|  | Processability | 100 | 100 | 100 | 98 | 95 |

As seen in Table 6, in Examples 6-1 and 6-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, the air permeation resistance was excellent, and substantially equivalent results were obtained about fuel economy and processability. In contrast, in Comparative Examples 6-2 and 6-3 using a comparative chemically modified microfibrillated cellulose not binding to rubber, deteriorated results were obtained about fuel economy though the air permeation resistance was slightly excellent.

<Undertread>

The various chemical agents used in Examples and Comparative Examples will be described below.

Natural rubber: TSR20
Chemically modified microfibrillated cellulose: chemically modified microfibrillated cellulose prepared in Preparation Example 1
Comparative chemically modified microfibrillated cellulose: comparative chemically modified microfibrillated cellulose prepared in Preparation Example 2
Carbon black: Seast N manufactured by Tokai Carbon Co., Ltd. (N330, $N_2SA$: 74 $m^2/g$, DBP oil absorption: 102 ml/100 g)
Antioxidant: Nocrac 6C manufactured by Ouchi Shinko Chemical Industrial Co., Ltd. (N-phenyl-N'-(1,3-dimethylbutyl)-p-phonylenediamine) (6PPD)
Oil: Diana Process AH-24 manufactured by Idemitsu Kosan Co., Ltd.
Zinc oxide: zinc oxide #2 manufactured by Mitsui Mining & Smelting Co., Ltd.
Stearic acid: Stearic Acid Camellia, beads, manufactured by NOF Corp.
Sulfur: Seimi Sulfur manufactured by Nippon Kanryu Industry Co., Ltd. (oil content: 10%)
Vulcanization accelerator: Nocceler NS manufactured by Ouchi Shinko Chemical Industrial Co., Ltd. (N-t-butyl-2-benzothiazole sulfenamide [TBBS])

Examples 7-1 and 7-2 and Comparative Examples 7-1 to 7-3

Unvulcanized rubber compositions and vulcanized rubber compositions were prepared following the procedures of Example 1-1, except for using the recipes shown in Table 7.

Moreover, the unvulcanized rubber composition was formed into the shape of an undertread and assembled with other tire components on a tire building machine to build an unvulcanized tire, which was then vulcanized to produce a tire for testing (size: 195/65R15).

The thus obtained unvulcanized rubber compositions, vulcanized rubber compositions and tires for testing were evaluated as described below. The results are shown in Table 7.

(Processability: Measurement of Mooney Viscosity)

Evaluation of processability was carried out following the procedure of Example 4-1, except that the result was expressed as an index (Mooney viscosity index), with Comparative Example 7-1 equal to 100.

(Tensile Test)

A tensile test was carried out following the procedure of Example 2-1, except that the result was expressed as an index (breaking strength index), with Comparative Example 7-1 equal to 100.

(Viscoelasticity test)

A viscoelasticity test was carried out following the procedure of Example 2-1, except that the result was expressed as an index (tan δ index), with Comparative Example 7-1 equal to 100.

TABLE 7

|  |  | Com. Ex. 7-1 | Ex. 7-1 | Ex. 7-2 | Com. Ex. 7-2 | Com. Ex. 7-3 |
|---|---|---|---|---|---|---|
| Formulation (parts by mass) | Natural rubber | 100 | 100 | 100 | 100 | 100 |
|  | Chemically modified microfibrillated cellulose | — | 2 | 4 | — | — |
|  | Comparative chemically modified microfibrillated cellulose | — | — | — | 2 | 4 |
|  | Carbon black | 40 | 40 | 40 | 40 | 40 |
|  | Antioxidant | 2 | 2 | 2 | 2 | 2 |
|  | Oil | 5 | 5 | 5 | 5 | 5 |
|  | Zinc oxide | 2 | 2 | 2 | 2 | 2 |
|  | Stearic acid | 2 | 2 | 2 | 2 | 2 |
|  | Sulfur | 2 | 2 | 2 | 2 | 2 |
|  | Vulcanization accelerator | 1 | 1 | 1 | 1 | 1 |

TABLE 7-continued

|  |  | Com. Ex. 7-1 | Ex. 7-1 | Ex. 7-2 | Com. Ex. 7-2 | Com. Ex. 7-3 |
|---|---|---|---|---|---|---|
| Evaluation | Processability | 100 | 103 | 105 | 98 | 95 |
|  | Breaking strength | 100 | 110 | 105 | 90 | 85 |
|  | Fuel economy | 100 | 115 | 105 | 90 | 80 |

As seen in Table 7, in Examples 7-1 and 7-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, better or equivalent results were obtained about fuel economy, breaking strength, and processability. In contrast, in Comparative Examples 7-2 and 7-3 using a comparative chemically modified microfibrillated cellulose not binding to rubber, the fuel economy, breaking strength, and processability were not much good.

<Breaker Topping>

The various chemical agents used in Examples and Comparative Examples will be described below.

Natural rubber: TSR20

Chemically modified microfibrillated cellulose: chemically modified microfibrillated cellulose prepared in Preparation Example 1

Comparative chemically modified microfibrillated cellulose: comparative chemically modified microfibrillated cellulose prepared in Preparation Example 2

Carbon black: Shoblack N550 manufactured by Cabot Japan K.K. ($N_2SA$: 42 $m^2$/g, average particle size: 48 nm, DBP oil absorption: 113 ml/100 g)

Organic acid cobalt salt: cost-F manufactured by DIC Corp. (cobalt stearate, cobalt content: 9.5% by mass)

Antioxidant: Nocrac 6C manufactured by Ouchi Shinko Chemical Industrial Co., Ltd. (N-phenyl-N'-(1,3-dimethylbutyl)-p-phenylenediamine) (6PPD)

Oil: Diana Process AH-24 manufactured by Idemitsu Kosan Co., Ltd.

Zinc oxide: zinc oxide #2 manufactured by Mitsui Mining & Smelting Co., Ltd.

Stearic acid: Stearic Acid Camellia, beads, manufactured by NOF Corp.

Sulfur: Seimi Sulfur manufactured by Nippon Kanryu Industry Co., Ltd. (oil content: 10%)

Vulcanization accelerator: Nocceler DZ manufactured by Ouchi Shinko Chemical Industrial Co., Ltd. (N,N'-dicyclohexyl-2-benzothiazole sulfenamide)

(Examples 8-1 and 8-2 and Comparative Examples 8-1 to 8-3

Unvulcanized rubber compositions and vulcanized rubber compositions were prepared following the procedures of Example 1-1, except for using the recipes shown in Table 8.

Moreover, the unvulcanized rubber composition was formed into the shape of a breaker topping and assembled with other tire components on a tire building machine to build an unvulcanized tire, which was then vulcanized to produce a tire for testing (size: 195/65R15).

The thus obtained unvulcanized rubber compositions, vulcanized rubber compositions and tires for testing were evaluated as described below. The results are shown in Table 8.

(Viscoelasticity Test)

A viscoelasticity test was carried out following the procedure of Example 2-1, except that the results were expressed as indices (E* index and tan δ index), with Comparative Example 8-1 equal to 100.

(Tensile Test)

A tensile test was carried out following the procedure of Example 2-1, except that the result was expressed as an index (breaking strength index), with Comparative Example 8-1 equal to 100.

(Processability: Measurement of Mooney Viscosity)

Evaluation of processability was carried out following the procedure of Example 4-1, except that the result was expressed as an index (Mooney viscosity index), with Comparative Example 8-1 equal to 100.

TABLE 8

|  |  | Com. Ex. 8-1 | Ex. 8-1 | Ex. 8-2 | Com. Ex. 8-2 | Com. Ex. 8-3 |
|---|---|---|---|---|---|---|
| Formulation (parts by mass) | Natural rubber | 100 | 100 | 100 | 100 | 100 |
|  | Chemically modified microfibrillated cellulose | — | 2 | 4 | — | — |
|  | Comparative chemically modified microfibrillated cellulose | — | — | — | 2 | 4 |
|  | Carbon black | 60 | 60 | 60 | 60 | 60 |
|  | Organic acid cobalt salt | 2 | 2 | 2 | 2 | 2 |
|  | Antioxidant | 2 | 2 | 2 | 2 | 2 |
|  | Oil | 5 | 5 | 5 | 5 | 5 |
|  | Zinc oxide | 6 | 6 | 6 | 6 | 6 |
|  | Stearic acid | 2 | 2 | 2 | 2 | 2 |
|  | Sulfur | 5 | 5 | 5 | 5 | 5 |
|  | Vulcanization accelerator | 1 | 1 | 1 | 1 | 1 |
| Evaluation | Elastic modulus E* | 100 | 150 | 180 | 130 | 170 |
|  | Breaking strength | 100 | 110 | 105 | 85 | 85 |
|  | Fuel economy | 100 | 110 | 100 | 90 | 80 |
|  | Processability | 100 | 100 | 100 | 98 | 95 |

As seen in Table 8, in Examples 8-1 and 8-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, improved elastic modulus was exhibited and better or equivalent results were obtained about breaking strength, fuel economy, and processability. In contrast, in Comparative Examples 8-2 and 8-3 using a comparative chemically modified microfibrillated cellulose not binding to rubber, deteriorated results were obtained about breaking strength and fuel economy though improved elastic modulus was exhibited.

<Ply Topping>

The various chemical agents used in Examples and Comparative Examples will be described below.

Natural rubber: TSR20
Styrene-butadiene rubber: Nipol 1502 manufactured by Zeon Corp. (E-SBR, styrene content: 23.5% by mass, vinyl content: 18% by mass)
Chemically modified microfibrillated cellulose: chemically modified microfibrillated cellulose prepared in Preparation Example 1
Comparative chemically modified microfibrillated cellulose: comparative chemically modified microfibrillated cellulose prepared in Preparation Example 2
Carbon black: Shoblack N550 manufactured by Cabot Japan K.K. ($N_2SA$: 42 $m^2/g$, average particle size: 48 nm, DBP oil absorption: 113 ml/100 g)
Antioxidant: Nocrac 6C manufactured by Ouchi Shinko Chemical Industrial Co., Ltd. (N-phenyl-N'-(1,3-dimethylbutyl)-p-phenylenediamine) (6PPD)
Oil: Diana Process AH-24 manufactured by Idemitsu Kosan Co., Ltd.
Zinc oxide: zinc oxide #2 manufactured by Mitsui Mining & Smelting Co., Ltd.
Stearic acid: Stearic Acid Camellia, beads, manufactured by NOF Corp.
Sulfur: Seimi Sulfur manufactured by Nippon Kanryu Industry Co., Ltd. (oil content: 10%)
Vulcanization accelerator: Nocceler DZ manufactured by Ouchi Shinko Chemical Industrial Co., Ltd. (N,N'-dicyclohexyl-2-benzothiazole sulfenamide)

Examples 9-1 and 9-2 and Comparative Examples 9-1 to 9-3

Unvulcanized rubber compositions and vulcanized rubber compositions were prepared following the procedures of Example 1-1, except for using the recipes shown in Table 9.

Moreover, the unvulcanized rubber composition was formed into the shape of a ply topping and assembled with other tire components on a tire building machine to build an unvulcanized tire, which was then vulcanized to produce a tire for testing (size: 195/65R15).

The thus obtained unvulcanized rubber compositions, vulcanized rubber compositions and tires for testing were evaluated as described below. The results are shown in Table 9.

(Viscoelasticity Test)

A viscoelasticity test was carried out following the procedure of Example 2-1, except that the results were expressed as indices (E* index and tan δ index), with Comparative Example 9-1 equal to 100.

(Tensile Test)

A tensile test was carried out following the procedure of Example 2-1, except that the result was expressed as an index (breaking strength index), with Comparative Example 9-1 equal to 100.

(Flex Crack Growth Resistance Test)

A flex crack growth resistance test was carried out following the procedure of Example 2-1, except that the reciprocal of the measured value (length) was expressed as an index, with Comparative Example 9-1 equal to 100.

(Adhesion Strength)

Eight cords were arranged at regular intervals of 10 mm and the topping rubber (unvulcanized rubber composition) having a thickness of 0.7 mm was press-bonded to both sides thereof. The resulting rubberized cords were stored at a humidity of 60%. Then, two such rubberized cord sheets were laminated to each other at an angle of 90 degrees, and then a reinforcing rubber was press-bonded to both sides of the laminate. The resulting bonded product was shaped into a rectangle to match the shape of a mold for vulcanization. After the bonded product was vulcanized in the mold at 165° C. for 20 minutes, a slit was formed between the laminated two rubberized cord sheets in the vulcanized product, and then the sheets were pulled at 180 degrees at a rate of 50 mm/min using a tensile tester available from Instron to evaluate the peel force (kN/25 mm) between the rubberized cords. The peel force results are expressed as an index, with Comparative Example 9-1 equal to 100. A higher index means better adhesion between the cords and the topping rubber, leading to better durability.

TABLE 9

|  |  | Com. Ex. 9-1 | Ex. 9-1 | Ex. 9-2 | Com. Ex. 9-2 | Com. Ex. 9-3 |
|---|---|---|---|---|---|---|
| Formulation (parts by mass) | Natural rubber | 70 | 70 | 70 | 70 | 70 |
|  | Styrene-butadiene rubber | 30 | 30 | 30 | 30 | 30 |
|  | Chemically modified microfibrillated cellulose | — | 2 | 4 | — | — |
|  | Comparative chemically modified microfibrillated cellulose | — | — | — | 2 | 4 |
|  | Carbon black | 50 | 50 | 50 | 50 | 50 |
|  | Antioxidant | 2 | 2 | 2 | 2 | 2 |
|  | Oil | 6 | 6 | 6 | 6 | 6 |
|  | Zinc oxide | 4 | 4 | 4 | 4 | 4 |
|  | Stearic acid | 2 | 2 | 2 | 2 | 2 |
|  | Sulfur | 3 | 3 | 3 | 3 | 3 |
|  | Vulcanization accelerator | 1 | 1 | 1 | 1 | 1 |
| Evaluation | Elastic modulus E* | 100 | 155 | 190 | 150 | 175 |
|  | Breaking strength | 100 | 110 | 105 | 85 | 85 |
|  | Fuel economy | 100 | 110 | 100 | 90 | 80 |
|  | Flex crack growth resistance | 100 | 110 | 100 | 80 | 70 |
|  | Adhesion strength | 100 | 100 | 98 | 98 | 95 |

As seen in Table 9, in Examples 9-1 and 9-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, improved elastic modulus was exhibited and better or equivalent results were obtained about breaking strength, fuel economy, and flex crack growth resistance. In contrast, in Comparative Examples 9-2 and 9-3 using a comparative chemically modified microfibrillated cellulose not binding to rubber, deteriorated results were obtained about breaking strength and fuel economy though improved elastic modulus was exhibited.

<Tread>

The various chemical agents used in Examples and Comparative Examples will be described below.

Natural rubber: TSR20

Styrene-butadiene rubber: Nipol 1502 manufactured by Zeon Corp. (E-SBR, styrene content: 23.5% by mass, $ML_{1+4}$ (100° C.): 52)

Chemically modified microfibrillated cellulose: chemically modified microfibrillated cellulose prepared in Preparation Example 1

Comparative chemically modified microfibrillated cellulose: comparative chemically modified microfibrillated cellulose prepared in Preparation Example 2

Carbon black: Shoblack N550 manufactured by Cabot Japan K.K. ($N_2SA$: 42 $m^2/g$)

Silica: Ultrasil VN3 manufactured by Evonik Degussa ($N_2SA$: 175 $m^2/g$)

Silane coupling agent: Si69 manufactured by Evonik Degussa (bis(3-triethoxysilylpropyl)tetrasulfide)

Antioxidant: Nocrac 6C manufactured by Ouchi Shinko Chemical Industrial Co., Ltd. (N-phenyl-N'-(1,3-dimethylbutyl)-p-phenylenediamine) (6PPD)

Oil: Diana Process AH-24 manufactured by Idemitsu Kosan Co., Ltd.

Wax: Ozoace 0355 manufactured by Nippon Seiro Co., Ltd.

Zinc oxide: zinc oxide #2 manufactured by Mitsui Mining & Smelting Co., Ltd.

Stearic acid: Stearic Acid Camellia, beads, manufactured by NOF Corp.

Sulfur: Seimi Sulfur manufactured by Nippon Kanryu Industry Co., Ltd. (oil content: 10%)

Vulcanization accelerator: Nocceler DZ manufactured by Ouchi Shinko Chemical Industrial Co., Ltd. (N,N'-dicyclohexyl-2-benzothiazole sulfenamide)

Examples 10-1 and 10-2 and Comparative Examples 10-1 to 10-3

Unvulcanized rubber compositions and vulcanized rubber compositions were prepared following the procedures of Example 1-1, except for using the recipes shown in Table 10.

Moreover, the unvulcanized rubber composition was formed into the shape of a tread and assembled with other tire components on a tire building machine to build an unvulcanized tire, which was then vulcanized to produce a tire for testing (size: 195/65R15).

The thus obtained vulcanized rubber compositions and tires for testing were evaluated as described below. The results are shown in Table 10.

(Tensile Test)

A tensile test was carried out following the procedure of Example 2-1, except that the result was expressed as an index (breaking strength index), with Comparative Example 10-1 equal to 100.

(Viscoelasticity Test)

A viscoelasticity test was carried out following the procedure of Example 2-1, except that the result was expressed as an index (tan δ index), with Comparative Example 10-1 equal to 100.

(Abrasion Resistance)

The tires for testing were mounted on a domestic front-engine, front-wheel-drive vehicle. After traveling a distance of 8000 km, the groove depth in the tire tread portion was measured. The travel distance at which the tire groove depth was decreased by 1 mm was calculated and expressed as an index according to the expression given below. A higher index means better abrasion resistance.

(Abrasion resistance index)=(Travel distance at which the groove depth was decreased by 1 mm)/(Travel distance at which the groove depth of the tire of Comparative Example 10-1 was decreased by 1 mm)×100

(Wet-grip Performance)

The tires for testing were mounted on all wheels of a vehicle (domestic front-engine, front-wheel-drive vehicle, 2000 cc). The braking distance from an initial speed of 100 km/h was determined on a wet asphalt road. The results are expressed as an index. A higher index means better wet skid performance (wet-grip performance). The index was calculated according to the following expression:

(Wet skid performance)=(Braking distance of Comparative Example 10-1)/(Braking distance of each formulation example)×100

TABLE 10

|  |  | Com. Ex. 10-1 | Ex. 10-1 | Ex. 10-2 | Com. Ex. 10-2 | Com. Ex. 10-3 |
|---|---|---|---|---|---|---|
| Formulation (parts by mass) | Natural rubber | 30 | 30 | 30 | 30 | 30 |
|  | Styrene-butadiene rubber | 70 | 70 | 70 | 70 | 70 |
|  | Chemically modified microfibrillated cellulose | — | 2 | 4 | — | — |
|  | Comparative chemically modified microfibrillated cellulose | — | — | — | 2 | 4 |
|  | Carbon black | 10 | 10 | 10 | 10 | 10 |
|  | Silica | 80 | 80 | 80 | 80 | 80 |
|  | Silane coupling agent | 4 | 4 | 4 | 4 | 4 |
|  | Antioxidant | 1.5 | 1.5 | 1.5 | 1.5 | 1.5 |
|  | Oil | 15 | 15 | 15 | 15 | 15 |
|  | Wax | 1.5 | 1.5 | 1.5 | 1.5 | 1.5 |
|  | Zinc oxide | 2 | 2 | 2 | 2 | 2 |
|  | Stearic acid | 2 | 2 | 2 | 2 | 2 |
|  | Sulfur | 2 | 2 | 2 | 2 | 2 |
|  | Vulcanization accelerator | 1 | 1 | 1 | 1 | 1 |

TABLE 10-continued

|  |  | Com. Ex. 10-1 | Ex. 10-1 | Ex. 10-2 | Com. Ex. 10-2 | Com. Ex. 10-3 |
|---|---|---|---|---|---|---|
| Evaluation | Breaking strength | 100 | 110 | 105 | 85 | 85 |
|  | Fuel economy | 100 | 110 | 100 | 90 | 80 |
|  | Abrasion resistance | 100 | 110 | 105 | 80 | 75 |
|  | Wet-grip performance | 100 | 107 | 114 | 85 | 96 |

As seen in Table 10, in Examples 10-1 and 10-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, better or equivalent results were obtained about wet-grip performance, breaking strength, and fuel economy. In contrast, in Comparative Examples 10-2 and 10-3 using a comparative chemically modified microfibrillated cellulose not binding to rubber, deteriorated results were obtained about wet-grip performance, breaking strength, and fuel economy.

<Studless Winter Tire>

The various chemical agents used in Examples and Comparative Examples will be described below.

Natural rubber: TSR20

Polybutadiene rubber: BR150B manufactured by Ube Industries, Ltd. (cis content: 97% by mass, $ML_{1+4}$ (100° C.): 40, viscosity of 5% solution in toluene (25° C.): 48 cps, Mw/Mn: 3.3)

Chemically modified microfibrillated cellulose: chemically modified microfibrillated cellulose prepared in Preparation Example 1

Comparative chemically modified microfibrillated cellulose: comparative chemically modified microfibrillated cellulose prepared in Preparation Example 2

Carbon black: Diablack I manufactured by Mitsubishi Chemical Corp. (ISAF, $N_2SA$: 114 m²/g, average particle size: 23 nm, DBP oil absorption: 114 ml/100 g)

Silica: Ultrasil VN3 manufactured by Evonik Degussa ($N_2SA$: 175 m²/g)

Silane coupling agent: Si69 manufactured by Evonik Degussa (bis(3-triethoxysilylpropyl)tetrasulfide)

Antioxidant: Nocrac 6C manufactured by Ouchi Shinko Chemical Industrial Co., Ltd. (N-phenyl-N'-(1,3-dimethylbutyl)-p-phenylenediamine) (6PPD)

Oil: Diana Process AH-24 manufactured by Idemitsu Kosan Co., Ltd.

Wax: PS-32 manufactured by Nippon Seiro Co., Ltd. (paraffinic process oil)

Zinc oxide: zinc oxide #2 manufactured by Mitsui Mining & Smelting Co., Ltd.

Stearic acid: Stearic Acid Camellia, beads, manufactured by NOF Corp.

Sulfur: Seimi Sulfur manufactured by Nippon Kanryu Industry Co., Ltd. (oil content: 10%)

Vulcanization accelerator: Nocceler NS manufactured by Ouchi Shinko Chemical Industrial Co., Ltd. (N-t-butyl-2-benzothiazole sulfenamide [TBBS])

Examples 11-1 and 11-2 and Comparative Examples 11-1 to 11-3

Unvulcanized rubber compositions and vulcanized rubber compositions were prepared following the procedures of Example 1-1, except for using the recipes shown in Table 11.

Moreover, the unvulcanized rubber composition was formed into the shape of a tread and assembled with other tire components on a tire building machine to build an unvulcanized tire, which was then vulcanized to produce a tire for testing (size: 195/65R15, studless winter tire for passenger cars).

The thus obtained vulcanized rubber compositions and tires for testing were evaluated as described below. The results are shown in Table 11.

(Tensile Test)

A tensile test was carried out following the procedure of Example 2-1, except that the result was expressed as an index (breaking strength index), with Comparative Example 11-1 equal to 100.

(Viscoelasticity Test)

A viscoelasticity test was carried out following the procedure of Example 2-1, except that the result was expressed as an index (tan δ index), with Comparative Example 11-1 equal to 100.

(Performance on Snow and Ice (Grip Performance on Ice))

The tire for testing was evaluated for actual vehicle performance on ice under the conditions given below. The tires for testing were mounted on a domestic front-engine, rear-wheel-drive vehicle (2000 cc). The test was conducted in a test track (on ice) at the Asahikawa Tire Proving Ground of Sumitomo Rubber Industries, Ltd. in Hokkaido, Japan. The temperature on ice was −6° C. to −1° C.

Braking performance (brake stopping distance on ice): the stopping distance on ice was measured which was the distance required to stop after the brakes that lock up were applied at 30 km/h. The stopping distance was expressed as an index according to the expression given below, with Comparative Example 11-1 equal to 100. A higher index means better braking performance on ice.

(Index of grip on ice)=(Stopping distance of Comparative Example 11-1)/(Stopping distance of each formulation example)×100

(Abrasion Resistance)

Evaluation of abrasion resistance was carried out following the procedure of Example 10-1, except that the result was expressed as an index according to the expression given below.

(Abrasion resistance index)=(Travel distance at which the groove depth was decreased by 1 mm)/(Travel distance at which the groove depth of the tire of Comparative Example 11-1 was decreased by 1 mm)×100

TABLE 11

|  |  | Com. Ex. 11-1 | Ex. 11-1 | Ex. 11-2 | Com. Ex. 11-2 | Com. Ex. 11-3 |
|---|---|---|---|---|---|---|
| Formulation (parts by mass) | Natural rubber | 60 | 60 | 60 | 60 | 60 |
|  | Polybutadiene rubber | 40 | 40 | 40 | 40 | 40 |
|  | Chemically modified microfibrillated cellulose | — | 2 | 4 | — | — |
|  | Comparative chemically modified microfibrillated cellulose | — | — | — | 2 | 4 |
|  | Carbon black | 10 | 10 | 10 | 10 | 10 |
|  | Silica | 60 | 60 | 60 | 60 | 60 |
|  | Silane coupling agent | 4 | 4 | 4 | 4 | 4 |
|  | Antioxidant | 1.5 | 1.5 | 1.5 | 1.5 | 1.5 |
|  | Oil | 20 | 20 | 20 | 20 | 20 |
|  | Wax | 1.5 | 1.5 | 1.5 | 1.5 | 1.5 |
|  | Zinc oxide | 3 | 3 | 3 | 3 | 3 |
|  | Stearic acid | 2 | 2 | 2 | 2 | 2 |
|  | Sulfur | 2 | 2 | 2 | 2 | 2 |
|  | Vulcanization accelerator | 1 | 1 | 1 | 1 | 1 |
| Evaluation | Breaking strength | 100 | 110 | 105 | 85 | 85 |
|  | Fuel economy | 100 | 110 | 100 | 90 | 80 |
|  | Grip performance on ice | 100 | 110 | 118 | 105 | 108 |
|  | Abrasion resistance | 100 | 100 | 98 | 80 | 70 |

As seen in Table 11, in Examples 11-1 and 11-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, the grip performance on ice was excellent and better or equivalent results were obtained about breaking strength, fuel economy, and abrasion resistance. In contrast, in Comparative Examples 11-2 and 11-3 using a comparative chemically modified microfibrillated cellulose not binding to rubber, deteriorated results were obtained about breaking strength, fuel economy, and abrasion resistance though grip performance on ice was excellent.

<Lining Strip Layer of Run-flat Tire>

The various chemical agents used in Examples and Comparative Examples will be described below.

Natural rubber: TSR20

Polybutadiene rubber BR150B: BR150B manufactured by Ube Industries, Ltd. (cis content: 97% by mass, $ML_{1+4}$ (100° C.) 40, viscosity of 5% solution in toluene (25° C.): 48 cps, Mw/Mn: 3.3)

Polybutadiene rubber VCR412: VCR412 manufactured by Ube Industries, Ltd. (SPB-containing BR, cis content: 98% by mass, SPB content: 12% by mass, primary particle size of SPB: 250 nm, vinyl content: 1% by mass)

Chemically modified microfibrillated cellulose: chemically modified microfibrillated cellulose prepared in Preparation Example 1

Comparative chemically modified microfibrillated cellulose: comparative chemically modified microfibrillated cellulose prepared in Preparation Example 2

Carbon black: Shoblack N550 manufactured by Cabot Japan K.K. ($N_2SA$: 42 $m^2/g$)

Oil: Diana Process AH-24 manufactured by Idemitsu Kosan Co., Ltd.

Antioxidant: Nocrac 6C manufactured by Ouchi Shinko Chemical Industrial Co., Ltd. (N-phenyl-N'-(1,3-dimethylbutyl)-p-phenylenediamine) (6PPD)

Zinc oxide: zinc oxide #2 manufactured by Mitsui Mining & Smelting Co., Ltd.

Stearic acid: Stearic Acid Camellia, beads, manufactured by NOF Corp.

Sulfur: Seimi Sulfur manufactured by Nippon Kanryu Industry Co., Ltd. (oil content: 10%)

Vulcanization accelerator: Nocceler CZ manufactured by Ouchi Shinko Chemical Industrial Co., Ltd. (N-cyclohexyl-2-benzothiazole sulfenamide)

Examples 12-1 and 12-2 and Comparative Examples 12-1 to 12-3

Unvulcanized rubber compositions and vulcanized rubber compositions were prepared following the procedures of Example 1-1, except for using the recipes shown in Table 12.

Moreover, the unvulcanized rubber composition was formed into the shape of a lining strip layer and assembled with other tire components on a tire building machine to build an unvulcanized tire, which was then vulcanized to produce a tire for testing (size: 215/45R17; run-flat tire for passenger cars).

The thus obtained vulcanized rubber compositions and tires for testing were evaluated as described below. The results are shown in Table 12.

(Viscoelasticity Test)

A viscoelasticity test was carried out following the procedure of Example 2-1, except that the result was expressed as an index (E* index), with Comparative Example 12-1 equal to 100.

(Tensile Test)

A tensile test was carried out following the procedure of Example 2-1, except that the result was expressed as an index (breaking strength index), with Comparative Example 12-1 equal to 100.

(Fuel Economy (Rolling Resistance Properties))

The rolling resistance of the tire for testing was measured using a rolling resistance tester by running the tire with a 15×6JJ rim at an internal pressure of 230 kPa, a load of 3.43 kN, and a speed of 80 km/h, and expressed as an index (rolling resistance index), with Comparative Example 12-1 equal to 100. A higher index means better rolling resistance properties (fuel economy).

(Run-flat Durability)

The tire for testing was run at 80 km/h on a drum at an air internal pressure of 0 kPa. The distance run until the tire for testing broke down was measured and expressed as an index (run-flat durability index), with Comparative Example 12-1 equal to 100. A higher index means better run-flat durability.

TABLE 12

|  |  | Com. Ex. 12-1 | Ex. 12-1 | Ex. 12-2 | Com. Ex. 12-2 | Com. Ex. 12-3 |
|---|---|---|---|---|---|---|
| Formulation (parts by mass) | Natural rubber | 25 | 25 | 25 | 25 | 25 |
|  | Polybutadiene rubber BR150B | 67 | 67 | 67 | 67 | 67 |
|  | Polybutadiene rubber VCR412 | 8 | 8 | 8 | 8 | 8 |
|  | Chemically modified microfibrillated cellulose | — | 2 | 4 | — | — |
|  | Comparative chemically modified microfibrillated cellulose | — | — | — | 2 | 4 |
|  | Carbon black | 44 | 44 | 44 | 44 | 44 |
|  | Oil | 2 | 2 | 2 | 2 | 2 |
|  | Antioxidant | 2 | 2 | 2 | 2 | 2 |
|  | Zinc oxide | 6 | 6 | 6 | 6 | 6 |
|  | Stearic acid | 3 | 3 | 3 | 3 | 3 |
|  | Sulfur | 7 | 7 | 7 | 7 | 7 |
|  | Vulcanization accelerator | 2 | 2 | 2 | 2 | 2 |
| Evaluation | Elastic modulus E* | 100 | 130 | 160 | 120 | 135 |
|  | Breaking strength | 100 | 110 | 105 | 85 | 85 |
|  | Fuel economy | 100 | 110 | 100 | 90 | 80 |
|  | Run-flat durability | 100 | 110 | 120 | 90 | 95 |

As seen in Table 12, in Examples 12-1 and 12-2 using a chemically modified microfibrillated cellulose binding to rubber, the combined use of this chemically modified microfibrillated cellulose and carbon black synergistically and markedly improved the dispersibility of the chemically modified microfibrillated cellulose in the rubber composition. Therefore, excellent results were obtained about breaking strength and fuel economy. In contrast, in Comparative Examples 12-2 and 12-3 using a comparative chemically modified microfibrillated cellulose not binding to rubber, deteriorated results were obtained about breaking strength and fuel economy though the elastic modulus was improved.

These results demonstrated that: in rubber compositions containing a rubber component, a specific chemically modified microfibrillated cellulose containing an unsaturated bond, and carbon black, the dispersibility of the specific chemically modified microfibrillated cellulose in the rubber composition can be synergistically and markedly improved due to the combined use of the specific chemically modified microfibrillated cellulose and carbon black; and pneumatic tires, studless winter tires, or run-flat tires including components prepared using such rubber compositions are excellent in fuel economy and breaking strength and can also achieve a balanced improvement in other properties required for the components.

The invention claimed is:

1. A rubber composition, comprising a rubber component, a chemically modified microfibrillated cellulose, and carbon black,
   the chemically modified microfibrillated cellulose having a structure in which part of the hydroxyl hydrogen atoms of microfibrillated cellulose is replaced with a substituent represented by the following formula (1):

$$-A-R^1 \qquad (1)$$

wherein $R^1$ represents a C3-C30 hydrocarbon group having at least one unsaturated bond, and A represents a carbonyl group (—CO—),and
   wherein an amount of the carbon black is 5 to 200 parts by mass per 100 parts by mass of the rubber component.

2. The rubber composition according to claim 1, wherein the chemically modified microfibrillated cellulose has a degree of substitution of 0.05 to 2.0.

3. The rubber composition according to claim 1, wherein an amount of the chemically modified microfibrillated cellulose is 0.5 to 10 parts by mass per 100 parts by mass of the rubber component.

4. The rubber composition according to claim 1, wherein the chemically modified microfibrillated cellulose has an average fiber diameter of 2 to 100 nm.

5. A tire, comprising a component prepared using the rubber composition according to claim 1.

* * * * *